US007742031B2

(12) United States Patent
Numao

(10) Patent No.: US 7,742,031 B2
(45) **Date of Patent: *Jun. 22, 2010**

(54) DISPLAY DEVICE AND LIGHT SOURCE

(75) Inventor: Takaji Numao, Kashiwa (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 688 days.

This patent is subject to a terminal disclaimer.

(21) Appl. No.: 10/391,647

(22) Filed: Mar. 20, 2003

(65) Prior Publication Data

US 2004/0017348 A1 Jan. 29, 2004

Related U.S. Application Data

(62) Division of application No. 09/680,442, filed on Oct. 6, 2000, now Pat. No. 6,803,901.

(30) Foreign Application Priority Data

Oct. 8, 1999 (JP) ................................ 11-288016
Oct. 4, 2000 (JP) ............................ 2000-305405

(51) Int. Cl.
*G09G 3/20* (2006.01)
*G09G 3/36* (2006.01)
*G09G 5/00* (2006.01)
*G09G 5/10* (2006.01)
*G09G 5/02* (2006.01)
*G06F 3/038* (2006.01)

(52) U.S. Cl. ......................... 345/102; 345/55; 345/204; 345/690

(58) Field of Classification Search ........... 345/87–100, 345/102, 55, 204, 690–693; 349/61
See application file for complete search history.

(56) References Cited

U.S. PATENT DOCUMENTS 4,929,058 A 5/1990 Numao
4,958,915 A * 9/1990 Okada et al. .................. 345/97
5,039,978 A * 8/1991 Kronberg ............... 340/815.45
5,048,934 A 9/1991 Numao
5,121,233 A * 6/1992 Spencer et al. ................ 349/69

(Continued)

FOREIGN PATENT DOCUMENTS

JP 62-234127 A 10/1987

(Continued)

OTHER PUBLICATIONS

"LCD's for Moving Pictures Using Pi-cells", Hajime Nakamura et al., *Journal of the Japanese Liquid Crystal Society*, vol. 3, No. 2, pp. 99(17)-106(24) 1999.

(Continued)

*Primary Examiner*—Alexander S. Beck
(74) *Attorney, Agent, or Firm*—Birch, Stewart, Kolsch & Birch, LLP

(57) ABSTRACT

A display device includes: a gate driver for carrying out display scanning on pixels sequentially in a first direction of a TFT liquid crystal panel so as to set pixels to display states thereof according to information to be displayed by the pixels in the TFT liquid crystal panel. The pixels being arranged in two dimensions and being individually controllable in terms of the display state through illumination. There is a backlight, unit for illuminating the individual pixels with intensity of light which increases and subsequently decreases in synchronism with the display scanning carried out by the gate driver, but only after the display scanning. The arrangement enables the backlight flashing period to be determined independently from a TFT panel scanning period or response time of liquid crystal, ensures an extended operating time of a TFT panel, effects a display period equal to, or longer than, the black blanking type, and achieves higher contrast than the black blanking type.

18 Claims, 32 Drawing Sheets

U.S. PATENT DOCUMENTS

| | | | | |
|---|---|---|---|---|
| 5,128,782 | A * | 7/1992 | Wood | 349/61 |
| 5,239,293 | A * | 8/1993 | Barbier | 345/98 |
| 5,298,913 | A | 3/1994 | Numao et al. | |
| 5,337,068 | A * | 8/1994 | Stewart et al. | 345/88 |
| 5,387,921 | A * | 2/1995 | Zhang et al. | 345/102 |
| 5,402,143 | A * | 3/1995 | Ge et al. | 345/102 |
| 5,416,496 | A * | 5/1995 | Wood | 345/102 |
| 5,428,366 | A * | 6/1995 | Eichenlaub | 345/102 |
| 5,461,397 | A * | 10/1995 | Zhang et al. | 345/102 |
| 5,488,495 | A | 1/1996 | Numao | |
| 5,499,037 | A | 3/1996 | Nakagawa et al. | |
| 5,592,193 | A | 1/1997 | Chen | |
| 5,844,540 | A * | 12/1998 | Terasaki | 345/102 |
| 6,023,131 | A * | 2/2000 | Okita | 315/291 |
| 6,130,658 | A | 10/2000 | Yamamoto et al. | |
| 6,445,373 | B1 | 9/2002 | Yamamoto | |
| 6,448,951 | B1 * | 9/2002 | Sakaguchi et al. | 345/88 |
| 6,462,724 | B1 | 10/2002 | Ozawa et al. | |
| 6,552,704 | B1 * | 4/2003 | Zavracky et al. | 345/88 |

FOREIGN PATENT DOCUMENTS

| | | | |
|---|---|---|---|
| JP | 63-26875 | U | 2/1988 |
| JP | 63-92330 | U | 6/1988 |
| JP | 64-082019 | A | 3/1989 |
| JP | 03-198026 | A | 8/1991 |
| JP | 05-080717 | A | 4/1993 |
| JP | 07-121138 | A | 5/1995 |
| JP | 10-010997 | A | 1/1998 |
| JP | 10-186310 | A | 7/1998 |
| JP | 11-160675 | | 6/1999 |
| JP | 11-202285 | | 7/1999 |
| JP | 11-202286 | A | 7/1999 |
| JP | 2000-214827 | A | 8/2000 |

OTHER PUBLICATIONS

"Display Format for Hold Type Displays and Image Quality in Moving Picture Display", Soichiro Kurita et al., *Resume for 1st LCD Forum of the Japanese Liquid Crystal Society*, pp. 1-6.

"Improving the Moving-Image Quality of TFT-LCD's", K. Sueoka et al., *SID Digest*, pp. 203-206, 1997.

"Field-Sequential-Color LCD Using Switched Organic EL Backlighting", N. Ogawa et al. *SID Digest*, pp. 1098-1101, 1999.

* cited by examiner

FIG. 20a
PRIOR ART
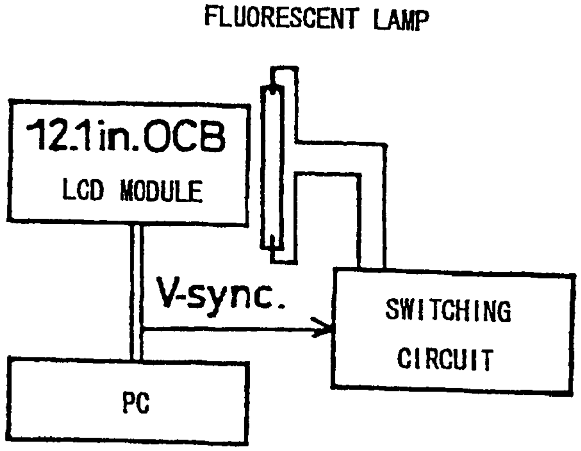
FIG. 20b
PRIOR ART
FIG. 20c
PRIOR ART
FIG. 20d
PRIOR ART
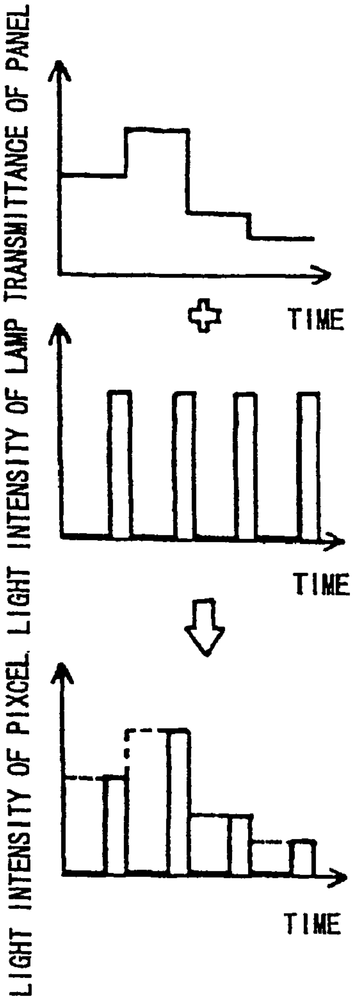

DISPLAY DEVICE AND LIGHT SOURCE

This application is a divisional of application Ser. No. 09/680,442, filed on Oct. 6, 2000, now U.S. Pat. No. 6,803, 901 B1 issued Oct. 12, 2004, the entire contents of which are hereby incorporated by reference and for which priority is claimed under 35 U.S.C. 120; and this application claims priority of Application No. 11-288016 and 2000-305405 filed in Japan on Oct. 8, 1999 and Oct. 4, 2000 under 35 U.S.C. 119.

FIELD OF THE INVENTION

The present invention relates to display devices with a display panel including pixels which are arranged in two dimensions, each pixel being constituted by an element capable of controlling transmittance and reflection of light, and light sources for use with the display devices.

BACKGROUND OF THE INVENTION

The moving-image-display quality (moving-image quality) of a typical LCD (Liquid Crystal Display) is inferior to that of a CRT (Cathode Ray Tube). This is regarded as a result of slow response speed of the liquid crystal in used.

For the purpose of solving this problem, Journal of the Japanese Liquid Crystal Society (Vol. 3, No. 2, 1999, pp., 99-106) describes an attempt to improve moving-image quality through an increased response speed of liquid crystal, by adopting a Pi-cell structure whereby a Pi-cell is flanked by optical compensators as shown in FIG. 17.

The paper mentions that a Pi-cell shows an improvement in response speed of liquid crystal over a TN liquid crystal cell: namely, a turn-on time of 1 ms and a turn-off time of 5 ms.

The Pi-cell structure successfully yields a response speed that is fast enough to draw an image in a single frame period. However, the moving-image quality of an LCD with a Pi-cell structure is still inferior to that of the CRT. See FIGS. 18*a* and 19*a* illustrating the moving image display on a CRT and a LCD with a Pi-cell structure respectively. The moving images are supposed to be moving in the directions denoted by the arrows.

The paper attributes the quality differences to illuminating characteristics of the CRT and the LCD. FIG. 18*b* shows the "impulse-type" illuminating characteristics of the CRT whereby pixels emit an impulse of light lasting for a short period of time. In contrast, FIG. 19*b* shows the "hold-type" illuminating characteristics of the LCD whereby pixels are hold alight continuously. According to the paper, the degradation of moving-image quality occurs in the LCD, because images in successive fields appear overlapping as a result of the motion of viewpoint.

The paper mentions that the problem is solved by the use of a backlight with impulse-type illuminating characteristics similar to those of the CRT. SID (Society for Information Display), 1997, pp., 203-206, "Improving the Moving-Image Quality of TFT-LCDs", describes a technique to impart impulse-type illuminating characteristics to the LCD (first technique).

According to the first technique, a fluorescent lamp is adopted for use as a backlight of an LCD originally having a hold-type transmittance as shown in FIG. 20*b*. The fluorescent lamp is flashed as shown in FIG. 20*c*, using a switching circuit for use with a fluorescent lamp configured as shown in FIG. 20*a*. The result is impulse-type illuminating characteristics as shown in FIG. 20*d* (hereinafter, such an LCD will be referred to as an "entire surface flash type"). The fluorescent lamp in FIG. 20*a* exhibits illuminating characteristics as show in FIG. 21*a* when a voltage in FIG. 21*b* is applied.

The paper describes, as detailed above, a further improvement of moving-image quality of an OCB (Optically Compensated Bend) cell by means of the first technique. A Pi-cell is a type of OCB cell.

The paper further discusses a second technique, whereby the pixels per se of the liquid crystal panel are used as a shutter to impart impulse-type illuminating characteristics to the LCD.

Specifically, a TFT panel 116 is used in which the display section is divided horizontally into an upper screen and a lower screen which are driven by various signals supplied from source drivers 117 and 118 provided to the respective upper and lower screens as shown in FIG. 22*d*.

The upper and lower source drivers 117 and 118 supplies a black signal and a video signal alternately as shown in FIG. 22*a* and FIG. 22*c* to each pixel of the TFT panel 116. In synchronism with the supply, a gate driver 119 supplies a gate signal shown in FIG. 22*b* to the TFTs each constituting a pixel of the TFT panel 116. The result is a blanking signal and a video signal being applied within a field period as shown in FIGS. 23*b* to 23*d* (hereinafter, such an LCD will be referred to as an "black blanking type").

According to the second technique, a black display period (interval between RS periods) appears on the hold-type video image in FIG. 23*a*, moving from the top to the bottom of the panel as shown in FIGS. 23*b* to 23*d*. This explains a successful improvement of moving-image quality.

From a viewpoint of flashing a backlight in an LCD module as above, the concept of field sequential color, whereby-a color image display is effected by displaying red, green, and blue images in a time series, is similar to the concept of improving moving-image quality.

SID (Society for Information Display), 1999, DIGEST, pp., 1098-1101, "Field-Sequential-Color LCD Using Switched Organic EL Backlighting" describes a conventional driving method for a field sequential color display. According to the driving method, the device is driven in the time sequence shown in FIG. 24.

Referring to FIG. 24, voltage is applied to a TFT pixel in period (1), response of liquid crystal is awaited in period (2), and an EL (electro-luminescence) backlight is flashed across the screen in period (3). The backlight of this kind of LCD is flashed across the screen similarly to that of the entire-surface-flash-type LCD.

According to the new driving method introduced in the paper, voltage is applied to TFT pixels starting in the top line of the panel and moving down to the bottom line of the panel as shown in FIG. 25. In synchronism with the voltage application to a particular line (however, after a response time of liquid crystal is elapsed), an EL backlight corresponding to that line is flashed.

In prior art example described in the paper, an EL is used as a backlight for use with a field sequential color display; however, a fluorescent lamp may be used instead. In the event, the flashing of the fluorescent lamp should be controlled using the circuit for controlling the flashing of a fluorescent lamp disclosed in Japanese Laid-Open Patent Application No. 11 160675/1999 (Tokukaihei 11 160675; published on Jun. 18, 1999).

FIG. 26 shows the arrangement of a circuit for controlling the flashing of a fluorescent lamp described as a conventional example in the Laid-Open patent application.

The circuit for controlling the flashing of a fluorescent lamp, as shown in FIG. 26, includes: high voltage generating means 115 constituted by a DC power source 105 and an inverter 107; and three cold cathode tubes 108, 109, and 110 emitting red, green, and blue light respectively. The cold cathode tubes 108, 109, and 110 are connected in series to switches 111, 112, and 113 respectively. The switches 111 to 113 are each constituted by a high-voltage-resistant bidirectional thyristor which is readily available on the market at a cheap price. By closing one of the switches 111 to 113, a path is established for the high voltage generating means 115 to apply voltage only to the corresponding one of the cold cathode tubes 108 to 110.

This field sequential color technique corresponds to the conventional driving method mentioned above in reference to the SID '99 paper.

However, in a circuit in FIG. 26 disclosed in the Laid-Open patent application, the switches 111 to 113 each constituted by a bidirectional thyristor are not resistant enough to high voltage when they are all open; if the high voltage generating means 115 applies voltage, breakdown takes place in one or more of the open cold cathode tubes 108 to 110, disrupting a complete dark state.

To solve this problem, the Laid-Open patent application suggests the use of a novel circuit for controlling the flashing a fluorescent lamp which includes high voltage generating means 114 with an additional switch 106 interposed between the DC power source 105 and the inverter 107 as shown in FIG. 27. When no breakdown is desired in any of the three cold cathode tubes 108 to 110, the switch 106 constituting a part of the high voltage generating means 114 is opened to keep the output level of the inverter 107 below a breakdown voltage, preventing breakdown to occur in all of the cold cathode tubes 108 to 110.

A summary prepared for the 1st LCD Forum of the Japanese Liquid Crystal Society, titled "Display Method of Hold-Type Display Device and Quality of Display of Moving Images", mentions that quality of moving-image displays on a typical LCD is improved effectively by imparting to the LCD illuminating characteristics which are similar to those of the CRT, i.e., impulse-type illuminating characteristics.

The effectiveness of this method is supported by FIG. 28 showing the relationship between flashing ratios (compaction ratio) and five-level average ratings. The flashing ratio is a period during which a backlight or other illuminating means shines divided by a field period of an LCD or another hold-type display. The five levels average rating represents a result of a subjective evaluation of image quality.

For these reasons, the entire surface flash structure and the black blanking structure have been conventionally employed in LCDs to impart illuminating characteristics which are similar to those of impulse types to them.

However, conventional entire-surface-flash- and black-blanking-type displays still have problems as detailed below.

First, in conventional entire surface flash types of LCDs, display scanning is carried out as shown in FIG. 29; therefore, the display period is equal to a backlight flashing period which is given by equation (1):

$$\text{Backlight Flashing Period} = \text{Field Period} - (TFT\ \text{Panel Scanning Period} + \text{Liquid Crystal Response Period}) \qquad (1)$$

Equation (1) indicates that entire surface flash types of LCDs have a problem such that the backlight flashing period (display period) is reduced by a value equal to the liquid crystal response speed.

Supposing, for example, that the LCD has a Pi-cell structure, a field period is 16.6 ms, and the response time of the liquid crystal (turn-off time of the Pi-cell) is 5 ms, the backlight flashing period of 8.3 ms (equivalent to a 50% flashing ratio in FIG. 28) is only ensured by the scanning period of the TFT panel of 3.3 ms, which is extremely short compared to those of entire surface hold types of LCDs. The TFT panel in an entire-surface-hold-type LCD has a scanning period which is equal to a single field period at 16.6 ms.

Next, in conventional black blanking types of LCDs, display scanning is carried out as shown in FIG. 30; therefore, the display period is given by equation (2):

$$\text{Display Period} = \text{Field Period} - TFT\ \text{Panel Scanning Period} \qquad (2)$$

Equation (2) indicates that the display period is independent from the response time of the liquid crystal. Accordingly, in black blanking types, the display period is not affected by the response time of the liquid crystal and is longer than those of entire surface flash types by a value equal to the response time of the liquid crystal.

However, black blanking types of LCDs have a problem in CR (contrast) which is inferior to those of entire surface flash types.

In the following, a comparison is made between black blanking types and entire surface flash types on the CR (contrast) in a field period.

The CR of black blanking types is given by equation (3):

$$CR = (\text{Display Period} \times \text{Bright Display Transmission Ratio}) / (\text{Field Period} \times \text{Dark Display Transmission Ratio}) \qquad (3)$$

In contrast, the CR of entire surface flash types is given by equation (4):

$$CR = (\text{Backlight Flashing Period} \times \text{Bright Display Transmission Ratio}) / (\text{Backlight Flashing Period} \times \text{Dark Display Transmission Ratio}) \qquad (4)$$

If, for example, the CRs of a black blanking type of LCD and an entire surface flash type of LCD are obtainable respectively from equations (3) and (4), which are rewritten as equations (5) and (6) when substituting 16.6 ms to the field period, 8.3 ms (equivalent to a 50% flashing ratio in FIG. 28) to the black blanking period, the bright display transmission ratio of the TFT display used of 30%, and the dark display transmission ratio of the TFT display used of 0.1%.

$$CR\ \text{of Black Blanking Type} = (8.3\ \text{ms} \times 30\ \text{w}) / (16.6\ \text{ms} \times 0.1\%) = 150 \qquad (5)$$

$$CR\ \text{of Entire Surface Flash Type} = (8.3\ \text{ms} \times 30\ \text{w}) / (8.3\ \text{ms} \times 0.1\%) = 300 \qquad (6)$$

Equations (5) and (6) indicate that the black blanking type has a lower CR than the entire surface flash type.

SUMMARY OF THE INVENTION

The present invention has an object to offer a display-device such that the backlight flashing period (display period) can be set independently from the TFT panel scanning period, the response time of liquid crystal, etc., so as to ensure an extended operating time of a TFT panel, a display period equal to, or longer than, that of the black blanking type, and a contrast higher than that of the black blanking type.

In order to achieve the object, a first display device in accordance with the present invention includes:

a display panel with pixels which are arranged in two dimensions, each of the pixels being constituted by an element capable of effecting a display through control of transmittance and reflection of light;

a scanning device for carrying out first scanning on the pixels sequentially in a first direction of the display panel so as to set the pixels to respective display states according to information to be displayed by the pixels; and an illumination device for illuminating the individual pixels, either with intensity of light which increases and subsequently decreases or for a limited period of time, in synchronism with the first scanning carried out by the scanning device, but only after the first scanning.

The first display device, arranged as above, includes pixels arranged in two dimensions, each of the pixels being constituted by a shutter element controlling transmittance (or reflection) of light. The display device carries out the first scanning (display scanning) so as to set the pixels to respective states sequentially in the first direction (scanning direction) according to information to be displayed by the pixels of the display device, and illuminates the pixels after substantially uniform periods have elapsed since the display scanning.

By determining in this manner from which display state to which display state each element, constituting one of the pixels, change and also in which changing state and during which period the element is illuminated, a uniform tone representation always results according to a desired display state without having to wait for the transmittance or reflection state of the element to light to completely change.

Therefore, illuminating periods can be determined independently from the change speeds (response speeds) regarding state change of the elements constituting the pixels.

The illuminating period is determined, for example, depending on how close the illuminating period brings the illuminating characteristics of the pixels in the display device to the impulse type, and as a result, how much the illuminating period improve the display quality of moving images.

During periods that are not designated as illuminating periods, the pixels in the display device do not need to be completely dark, but only have to emit light with a reduced intensity than during illuminating periods to improve moving-image quality.

For example, the illuminating device may control the illumination so that intensity of light illuminating pixels in synchronism with the first scanning exceeds intensity of light illuminating other pixels within a response time in which the pixels completely change the display states thereof.

A second display device in accordance with the present invention includes:

a display panel with pixels which are arranged in two dimensions, each of the pixels being constituted by an element capable of effecting a display through control of transmittance and reflection of light;

a scanning device for carrying out first scanning on the pixels sequentially in a first direction of the display panel so as to set the pixels to respective display states according to information to be displayed by the pixels; and an illumination device for illuminating the individual pixels with intensity of light which increases and subsequently decreases in synchronism with the first scanning carried out by the scanning device, but only after the first scanning, wherein:

the scanning device carries out second scanning on the pixels sequentially in the first direction so as to initialize some of the pixels which have changed the display states thereof in the first scanning; and the illumination device controls the illumination so as to reduce the intensity of light in the first scanning in synchronism with the second scanning carried out by the scanning device.

By carrying out reset scanning as the second scanning to set the pixels to a dark state approximately at the end of the illuminating period which follows display scanning as the first scanning, the second display device in accordance with the present invention sets the pixels in the display device to be dark during periods that are not designated as illuminating periods.

In a case of carrying out reset scanning following display scanning, by lowering intensity of light in each display area of the display device independently from the others approximately at the reset scanning, the reset scanning can be carried out without reduction in contrast.

Further, the illuminating device may control the illumination so as to vary the intensity of light or illuminating period in synchronism with the first scanning according to the information to be displayed by the pixels.

In other words, the illuminating device may vary the intensity in each display area of the display device according to the information on the pixels in that display area after the first scanning (display scanning).

By varying the intensity of light illuminating each display area of the display device according to the information on the display area in this manner, the display area is set to a maximum luminance which is most suited to the data according to which an image is displayed in the display area.

Further, by varying the maximum luminance for each display area, contrast can be improved, for example, by effecting a white display in a display area and a black display in another display area.

Apart from the control of illumination so that the intensity of light is reduced in the first scanning in synchronism with the second scanning carried out by the scanning device, an illuminating device may also control the illumination so as to illuminate the pixels for a limited period of time during the first scanning in synchronism with the second scanning carried out by the scanning device.

The following light sources are applicable in the display device arranged as above.

A first light source in accordance with the present invention is applicable in any one of the first to third display devices above, and includes:

n elongated light sources (n is a positive integer) disposed in a second direction which is perpendicular to the first direction; and switches, which are connected in series with the elongated light sources, for controlling turning on/off of the elongated light sources;

wherein, m flash circuits (m is a positive integer smaller than n) cause the n elongated light sources to flash through the control of the switches.

The light source may be arranged so that it includes another switch, which is interposed between the flash circuits and a power supply device for use with the flash circuits, for controlling connecting/disconnecting of power supply from the power supply device.

Alternatively, the light source may be arranged so that the number, m, of the flash circuits is determined so as to satisfy $m \geqq n/l$ where l is a positive real number representing a ratio of a field period to a maximum flashing period of the elongated light sources.

In this case, the number of flash circuits can be reduced by the value, n−m, which allows the light source to have a simplified overall arrangement and be reduced in dimensions.

For a fuller understanding of the nature and advantages of the invention, reference should be made to the ensuing detailed description taken in conjunction with the accompanying drawings.

BRIEF DESCRIPTION OF THE DRAWINGS

FIGS. 20*a* to 20*d* are explanatory drawings showing the first method to impart impulse-type illuminating characteristics to conventional LCDs.

DESCRIPTION OF THE EMBODIMENTS

Embodiment 1

The following description will discuss an embodiment in accordance with the present invention. In the present embodiment, a TFT (Thin Film Transistor) liquid crystal display with a color display capability will be explained as the display device. The TFT liquid crystal panel used here in the TFT liquid crystal display is one which is widely available on the market in the form of a module; no explanation will be given regarding the manufacturing method of the TFT liquid crystal panel.

Figure 1:
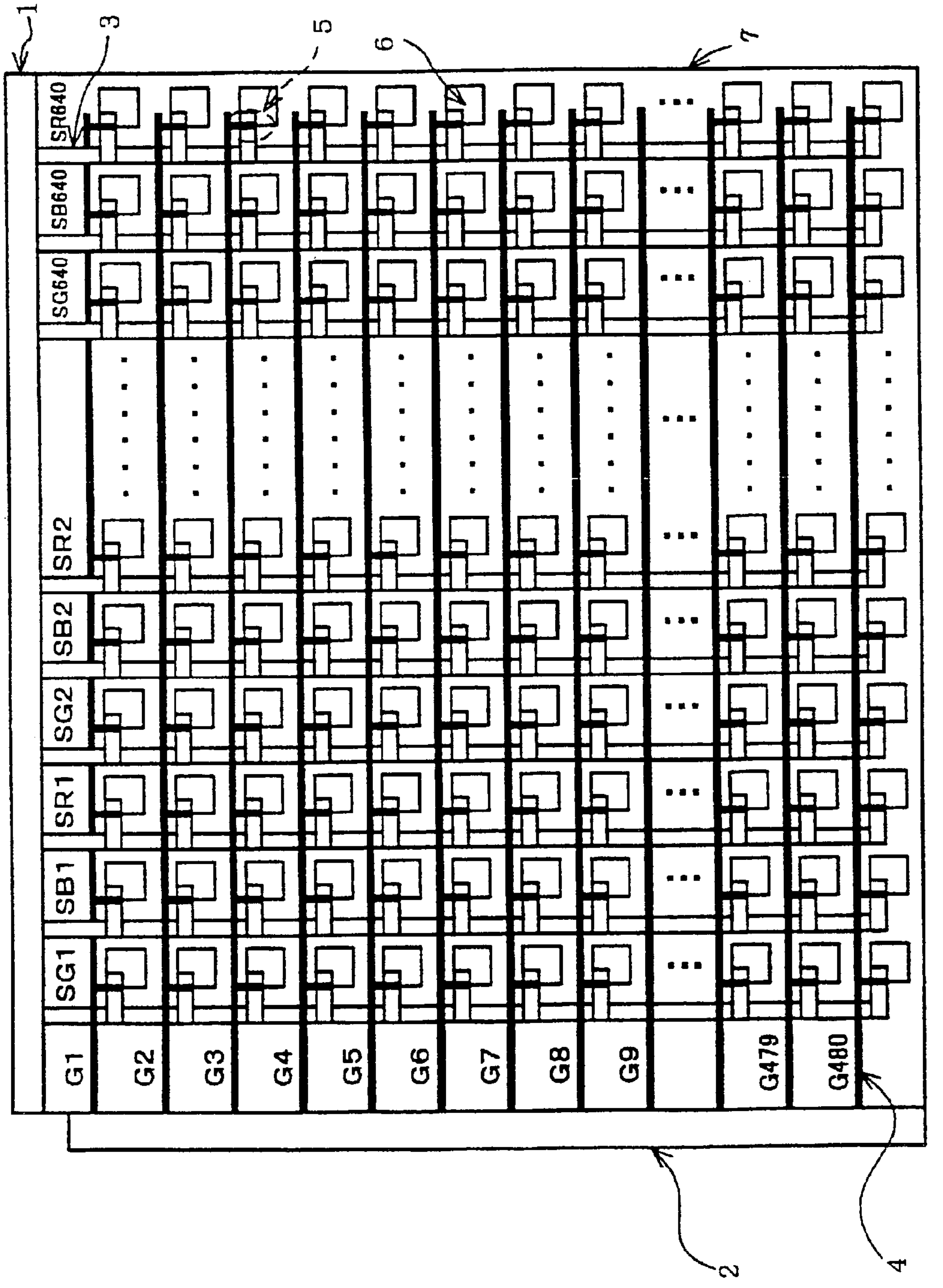
FIG. 1 is a plan view schematically showing a TFT liquid crystal panel in a TFT liquid crystal display as a display device in accordance with the present invention.

The TFT liquid crystal display of the present embodiment, as shown in FIG. 1, includes a TFT liquid crystal panel 7 as a display panel constituted by a two-dimensional element which has pixels arranged in two dimensions, each pixel being constituted by a element capable of effecting a display through the control of the transmittance and reflection of light.

The TFT liquid crystal panel 7 includes source electrodes 3 and gate electrodes 4 arranged in a matrix and further includes a TFT 5 as a switching element and a pixel electrode 6 electrically connected to the TFT 5 at every crossing point of the source electrodes 3 and the gate electrodes 4.

The TFT liquid crystal panel 7 used here is a TFT liquid crystal panel of a VGA (640 in width and 480 in height) resolution. The source electrodes 3 total 640 for each color (SG 1 to SG 640, SB 1 to SB 640, and SR 1 to SR 640). The gate electrodes 4 total 480 (G1 to G 480).

The source electrodes 3 are electrically connected to the TFTs 5 along their length and to a source driver 1 at their ends. The source driver 1 thus supplies a drive signal to the TFTs 5, for example.

Meanwhile, the gate electrodes 4 are electrically connected to the TFTs 5 along their length and to a gate driver 2 at their ends. The gate driver 2 thus supplies a drive signal to the TFTs 5 for example.

The gate driver 2 is adapted to carry out first scanning (display scanning) to set the pixels in the TFT liquid crystal panel 7 to their individual display states according to the information to be displayed. The first scanning is carried out sequentially in a scanning direction which is a first direction of the TFT liquid crystal panel 7.

Accordingly, the gate driver 2 applies a gate-ON voltage as a drive signal to one of the gate electrodes 4, while the source driver 1 supplies electric charges as a drive signal to the TFTs 5 turned on by the gate-ON voltage through one of the source electrode 3. Thus, the potential difference is determined between the pixel electrodes 6 connected to the TFTs 5 and opposite electrodes provided on the opposite substrate (not shown). The TFT liquid crystal panel 7 display a desired image by driving the liquid crystal interposed between the pixel electrodes 6 and the opposite electrode.

Here, a pixel in the TFT liquid crystal panel 7 refers to a pixel electrode 6 and liquid crystal driven by the pixel electrode 6.

Figure 2:
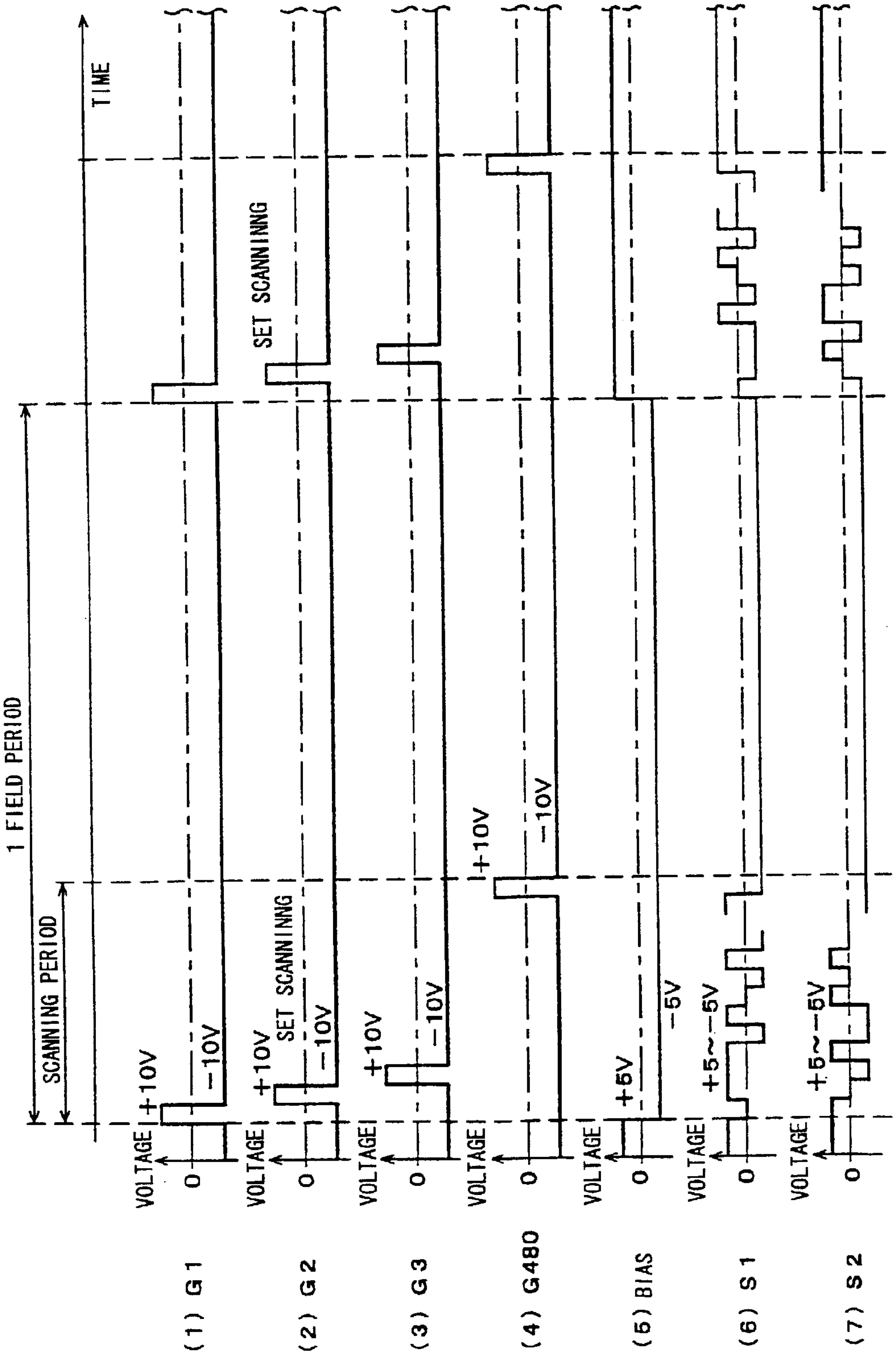
FIG. 2 is a diagram showing waveforms to drive a TFT liquid crystal panel for use in an embodiment in accordance with the present invention.

FIG. 2 shows waveforms of the drive signal applied to the electrodes in the TFT liquid crystal panel 7 arranged as above. First, in display scanning, the gate driver 2 applies a gate-ON voltage (shown as "+10V" in FIGS. 2(1) to 2(4)) to one of the gate electrodes G1 to G480 and a gate-OFF voltage (shown as "−10V" in FIGS. 2(1) to 2(4)) to the other gate electrodes, while the source driver 1 supplies electric charge to the pixel electrodes 6 through the TFTs 5 turned on by the gate-ON voltage in FIG. 1. The process is repeated from one gate electrode to a next to cover the entire display area.

During this period, voltage (shown as "+5~−5V" in FIGS. 2(6) and 2(7)) is applied to the pixel electrodes 6 by means of electric charge supplied by the source driver 1, so as to set the liquid crystal on the pixel electrodes 6 in a predetermined state (value determined based on image information). A voltage, either +5V or −5V in (5) of FIG. 2, is applied to the opposite electrodes.

Figure 3:
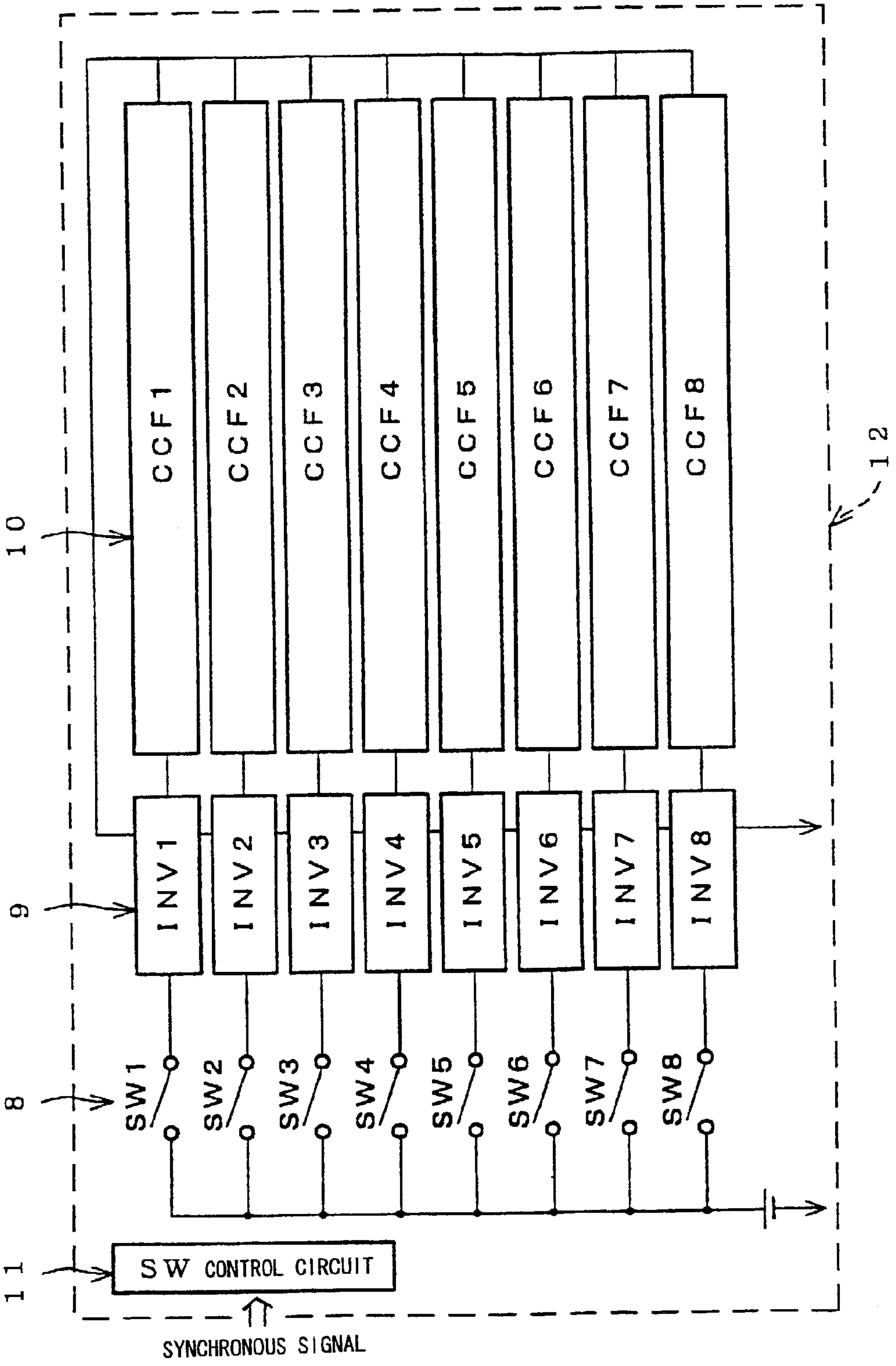
FIG. 3 is a plan view schematically showing a backlight unit for use in an embodiment in accordance with the present invention.

The TFT liquid crystal panel 7 subjected to such scanning is used superimposed on a backlight unit 12 whose arrangement is schematically shown in FIG. 3.

The backlight unit 12 is constituted by eight inverters 9 (INV 1 to INV 8), eight fluorescent lamps (elongated light source) 10 (CCF1 to CCF8), eight switches 8 (SW1 to SW8) as means to switch on/off the inverters 9, and a SW control circuit 11 for controlling the switches 8 according to a synchronization signal input from a TFT controller (not shown). The switches 8, inverters 9, and fluorescent lamps 10 are connected in series.

The fluorescent lamps 10 in the backlight unit 12 is provided in parallel to the gate electrodes 4 in the TFT liquid crystal panel 7 in FIG. 1. Each of the fluorescent lamps 10 illuminates 60 of the gate electrodes 4. Therefore, in the TFT liquid crystal panel 7, those pixels which are connected to the 60 gate electrodes 4 are illuminated concurrently.

In the backlight unit 12, an inverter is assigned to each fluorescent lamp. The flashing of the fluorescent lamps 10 in the backlight unit 12 is synchronized with the display scanning carried out on the TFT liquid crystal panel 7 according to the timing chart shown in FIG. 4.

Accordingly, the backlight unit 12 illuminates the pixels being subjected to the first scanning with light of higher intensity than the other pixels, in synchronism with the first scanning by the gate driver 2.

Figure 4:
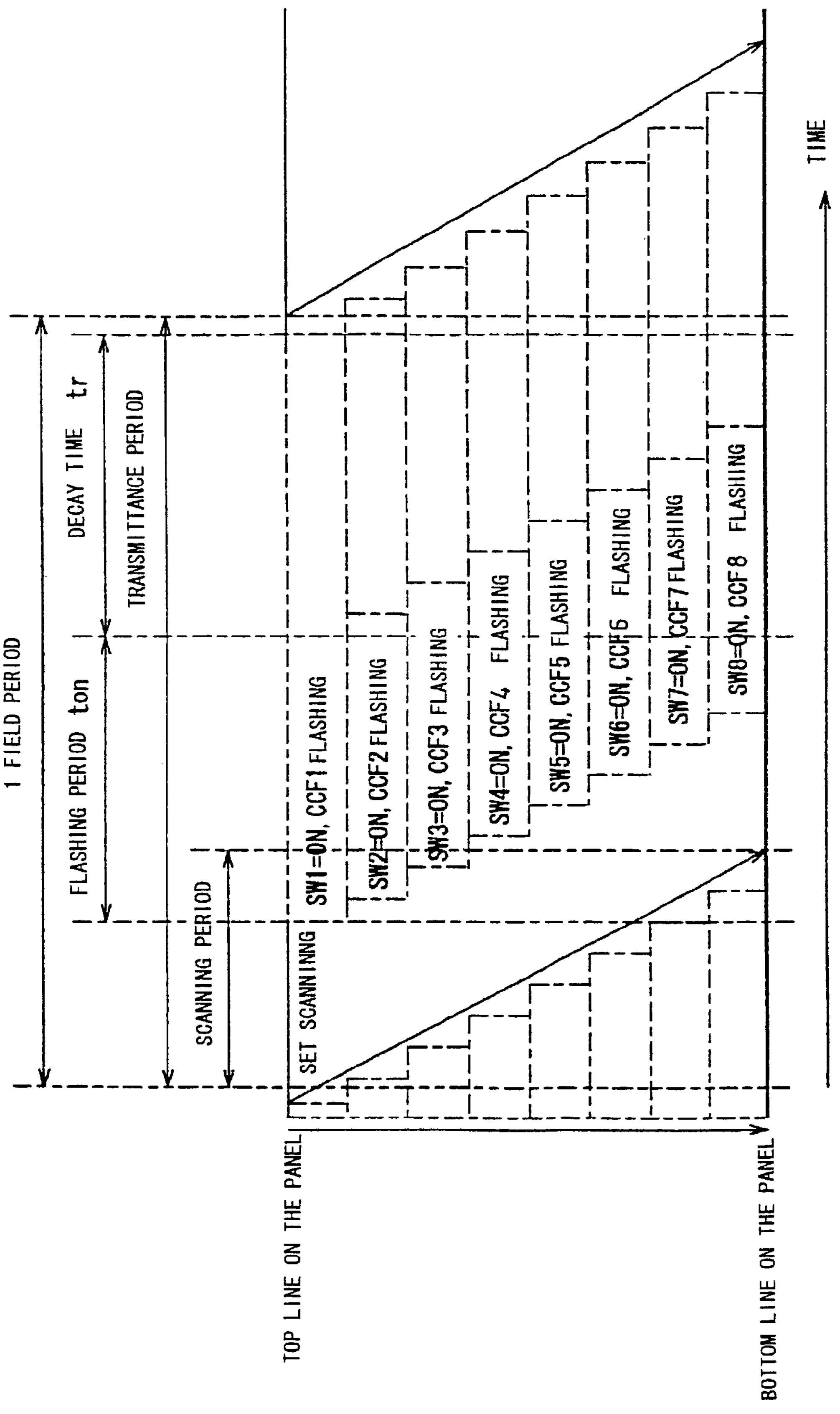
FIG. 4 is a timing chart showing the relationship between the scanning timings of a TFT liquid crystal panel and the flashing timings of a backlight unit for use in an embodiment in accordance with the present invention.

Specifically, display scanning is carried out by applying a gate-ON voltage to one of the gate electrodes G1 to G480 in FIG. 1 and supplying predetermined electric charge to the pixel electrodes 6 through the TFTs 5 turned on by the gate-ON voltage. The process is repeated sequentially from the gate electrode G1 to the gate electrode G480 (the first direction) to cover the entire display area. The fluorescent lamp 10 is turned on by closing the switch 8 for use to provide power supply from the inverter 9 connected to that fluorescent lamp 10 after a certain period has elapsed since the completion of display scanning carried out on those pixel electrodes 6 which are allocated to the fluorescent lamp 10. This process is repeated sequentially from the first fluorescent lamp to the last fluorescent lamp to cover the entire display area The period between the completion of display scanning and the start of the flashing of the corresponding fluorescent lamp 10 does not change significantly from lamp to lamp. If the backlight in FIG. 3 is used, each process is carried out on about an eighth of the entire display area, which is equivalent to the area allocated to one of the eight fluorescent lamps that divide the TFT liquid crystal panel 7 into eight portions, as shown in FIG. 4; the process is repeated sequentially from the fluorescent lamp CCF1 to the fluorescent lamp CCF8 in FIG. 3 to cover the entire display area.

Then, after being flashed for a certain period of time (backlight (fluorescent lamp) flashing period referred to as "ton"), the fluorescent lamp 10 is turned off by opening the switch 8 for use to provide power supply from the inverter 9 connected to that fluorescent lamp 10. However, the fluorescent lamp 10 needs a certain period of time (decay time, "tr") before its luminance decays to 1/N of the flashing luminance.

Incidentally, in the field sequential color method explained above in "BACKGROUND OF THE INVENTION" whereby a color image is produced by displaying three color, i.e., RGB, images, in a time series, the decay time (decay characteristics) causes the three color images to appear having mixed color. In the field sequential color method, an image is displayed three times as quick as in the present embodiment (three images are displayed within the same length of time); therefore, a field period in the field sequential color method is limited to only ⅓ times that of the present embodiment. Thus, the 1/10 decay time of the fluorescent lamp must be equal to, or less than, half the field period (5.6 ms) of the field sequential color method.

It is also preferred if the 1/10 decay time of the fluorescent lamp 10 of the present embodiment is equal to, or less than, half the field period (16.6 ms) to improve moving-image quality. However, even if the 1/10 decay time is equal to, or more than, the field period, the present embodiment is still advantageous in improvement of moving-image quality over the use of a backlight which shines always at constant luminance. Accordingly, the decay characteristics of the fluorescent lamp 10 may be determined taking account of the illuminating efficiency of the backlight and the improvement of moving-image quality.

In the present embodiment, as mentioned above, the period from the completion of display scanning on a group of pixel electrodes 6 to the start of the closing of the switch 8 for use to provide power supply from the inverter 9 connected to the fluorescent lamp 10 to illuminate the group of pixel electrodes 6 may be determined independently from the response speed of the liquid crystal, because the period from the application of voltage to the first pixel electrode in a group of pixel electrodes 6 to the flashing of the fluorescent lamp 10 to illuminate the group of pixel electrodes 6 does not change significantly from group to group.

Figure 5:
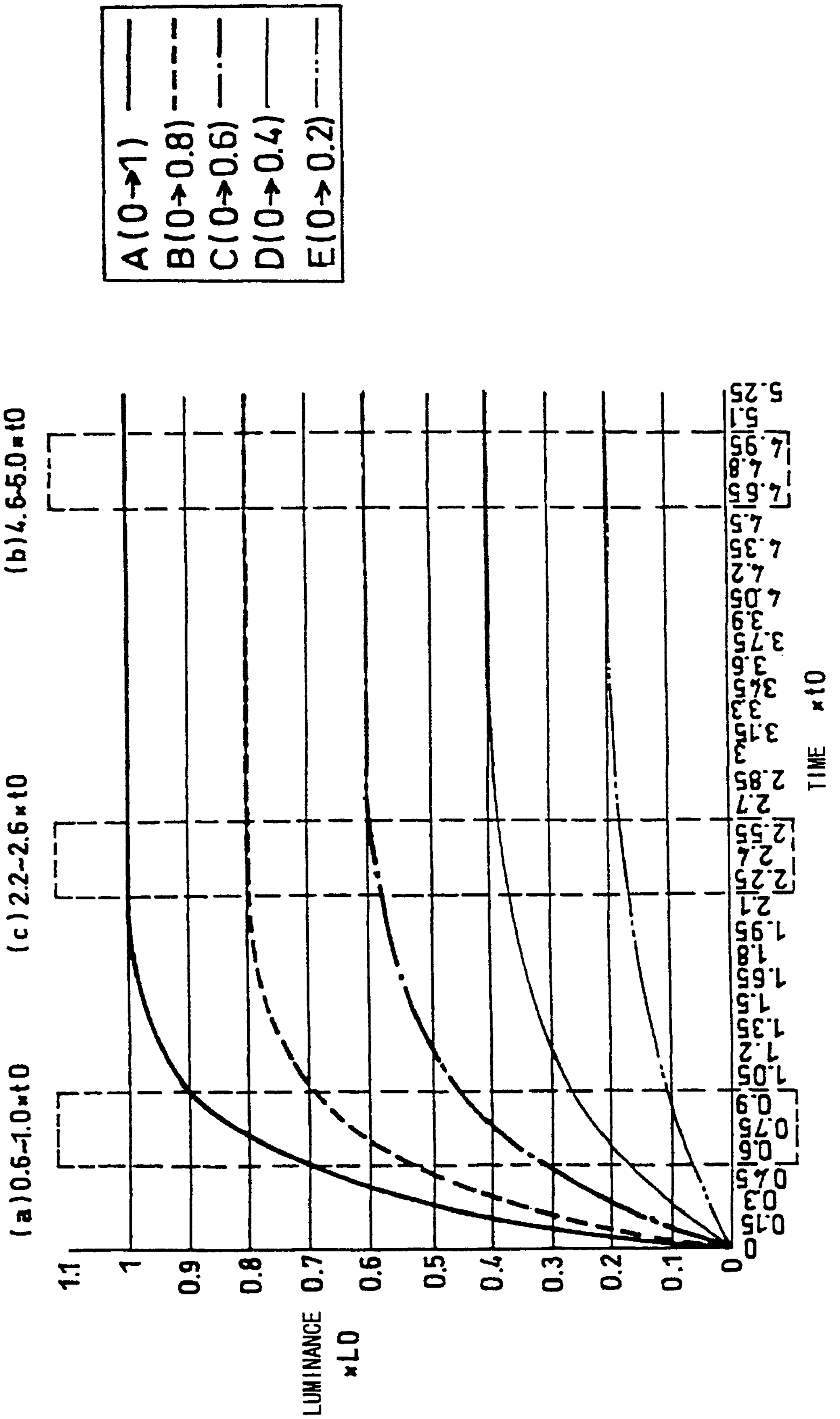
FIG. 5 is a graph showing response speed characteristics of a liquid crystal.

Now reference should be made to FIG. 5 constituted by a graph schematically showing the response speed of a liquid crystal. The luminance L0 of a liquid crystal is determined by the applied voltage V0.

In the graph in FIG. 5, the lines A to E show the time-luminance relationships of a liquid crystal when the applied voltage V0 is varied so that the liquid crystal exhibits 1.0, 0.8, 0.6, 0.4, and 0.2 times the luminance L0 respectively after a response time has elapsed. In the following description, for convenience, the saturated luminance represented by the lines A to E will be denoted as 1.0, 0.8, 0.6, 0.4, and 0.2 respectively with respect to the reference luminance L0.

The backlight was flashed when the liquid crystal has not yet fully responded, for example, during the period (a) (0.6 to 1.0×t0) of the graph constituting FIG. 5 and also when the liquid crystal had fully responded, for example, during the period (b) (4.6 to 5.0×t0). Tone representation were compared between the two cases, with the result shown in the graph constituting FIG. 6. Although not included in FIG. 6, the tone representation when the backlight was flashed during the period (c) in FIG. 5 fell between those of the periods (a) and (b) in FIG. 5.

Figure 6:
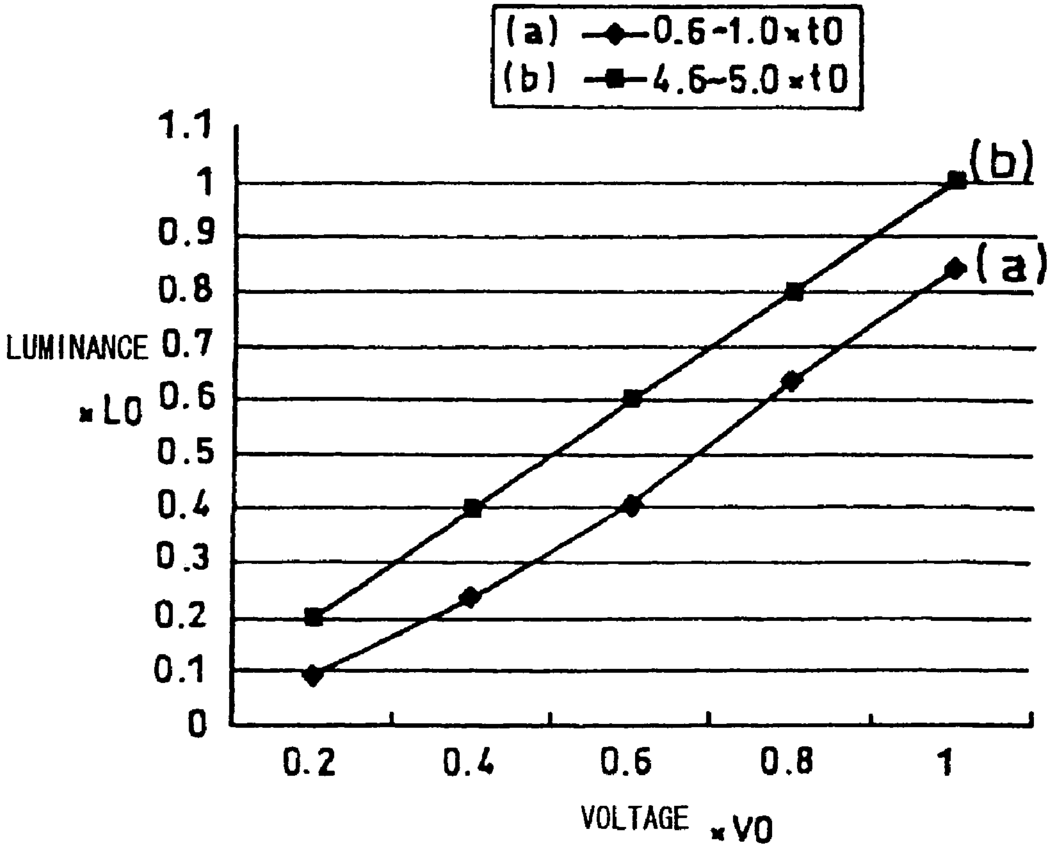
FIG. 6 is a graph showing the relationship between backlight flashing periods and tone representation of a TFT liquid crystal panel.

In FIG. 6, the line (a) represents the relationship between luminance and voltages during the period (a) in FIG. 5. The line (b) represents the relationship between luminance and voltages during the period (b) in FIG. 5. A comparison of the two lines confirms that if the backlight is flashed during the period 0.6×t0 to 1.0×t0, the liquid crystal shines only at luminance 0.8×L0 despite the application of the voltage V0 (V0×1) which could cause the liquid crystal to shine at luminance L0 (L0×1) if the backlight was flashed in the period 4.6×t0 to 5.0×t0.

The linear characteristic of the voltage-luminance relationship does not change between the case where the backlight is flashed in the period 4.6×t0 to 5.0×t0 denoted as (b) in FIG. 5 and the case where the backlight is flashed in the period 0.6×t0 to 1.0×t0 denoted as (a) in FIG. 5. However, the applied voltage should be determined taking good account of the fact that the voltage-tone relationship does differ between the two cases.

For these reasons, if the period from the application of voltage to the first pixel electrode in a group of pixel electrodes 6 to the flashing of the fluorescent lamp 10 to illuminate the group of pixel electrodes 6 does not change significantly from group to group, good tone representation is ensured without waiting for the full response of the liquid crystal.

Therefore, in the present embodiment, the backlight flashing period may be determined independently from the response time of liquid crystal. Unlike the field sequential color method explained above in the description above regarding prior art, the method introduced here to improve moving-image quality is able to solve the problem that the light source illumining pixels may not be flashed until the liquid crystal responds. It should be noted, however, that luminance does not start at zero in the display scanning in FIG. 4, while the response speeds in FIG. 5 are measured starting at zero luminance.

Figure 7:
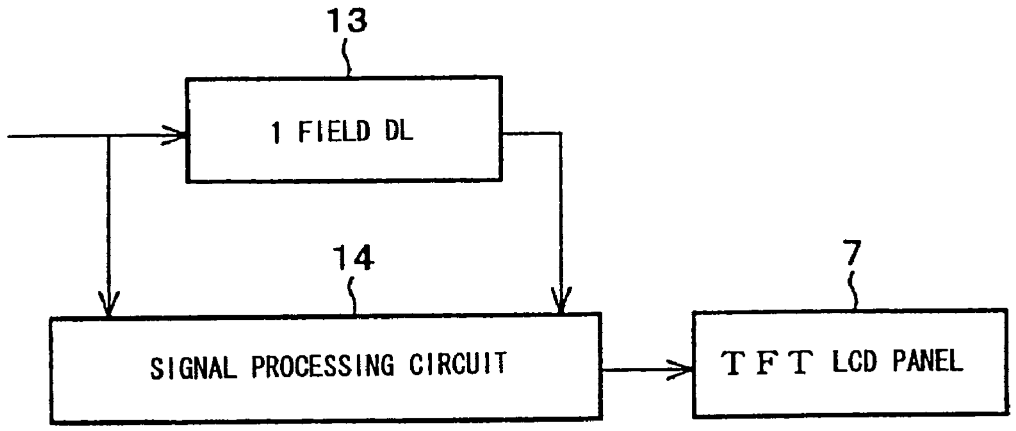
FIG. 7 is a block diagram schematically showing an example of a signal processing circuit for use in embodiment 1 in accordance with the present invention.
Figure 8:
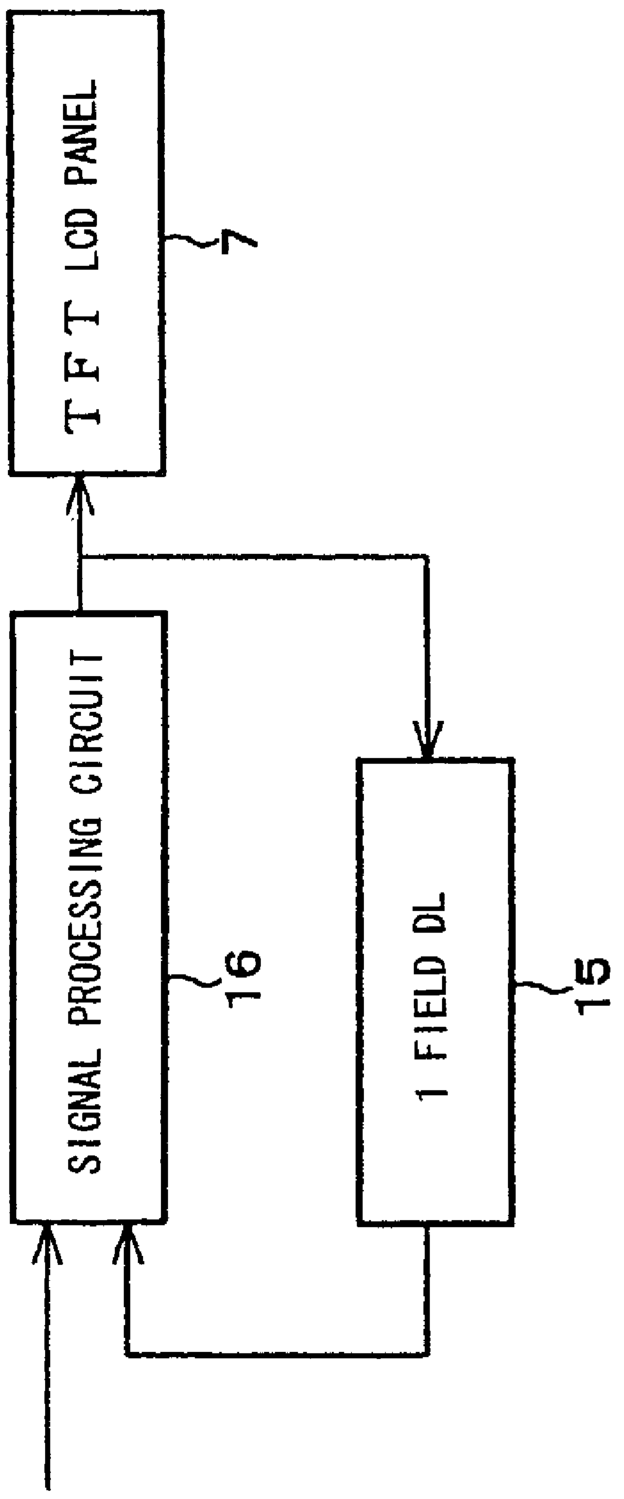
FIG. 8 is a block diagram schematically showing another example of a signal processing circuit for use in embodiment 1 in accordance with the present invention.

Accordingly, either a signal processing circuit 14 or 16 needs to be used in the structure shown in FIG. 7 or 8, respectively, to vary the voltage applied to the TFT liquid crystal panel 7 using a one-field DL 13 or 15 based on the pre-scanning conditions of the field and the information to be displayed.

After voltage is applied to the first pixel electrode in a group of pixel electrodes 6, the fluorescent lamp 10 to illuminate the group of pixel electrodes 6 may be flashed without having to wait for the liquid crystal to become ready to display half-tones. However, for improved efficiency in the use of light (or to achieve increased crispness in image quality with sufficiently subdued dark state luminance), it is preferred if the fluorescent lamp 10 is flashed only after the liquid crystal in its darkest state has fully responded and changed to its brightest state (or only after the liquid crystal in its brightest state has fully responded and changed to its darkest state).

As can be understood from the timing chart in FIG. 4 showing that the fluorescent lamp CCF1 for illuminating the group of pixels at the top of the display panel is flashed while the group of gate electrodes at the bottom of the display panel is still being scanned, the backlight flashing period may be set independently from the TFT panel scanning period in the present embodiment.

Therefore, in the present embodiment, the backlight flashing period may be set independently from the TFT panel scanning period, the response time of liquid crystal, etc. only taking account of improvement of moving-image quality and estimated costs. Note that to achieve improvement of moving-image quality, the backlight flashing period is preferably set equal to or less than half the single field period.

Embodiment 2

The following description will discuss another embodiment in accordance with the present invention. The TFT liquid crystal panel 7 in FIG. 1 and the backlight unit 12 in FIG. 3 are already explained in embodiment 1 above; description is omitted giving details of them.

Figure 9:
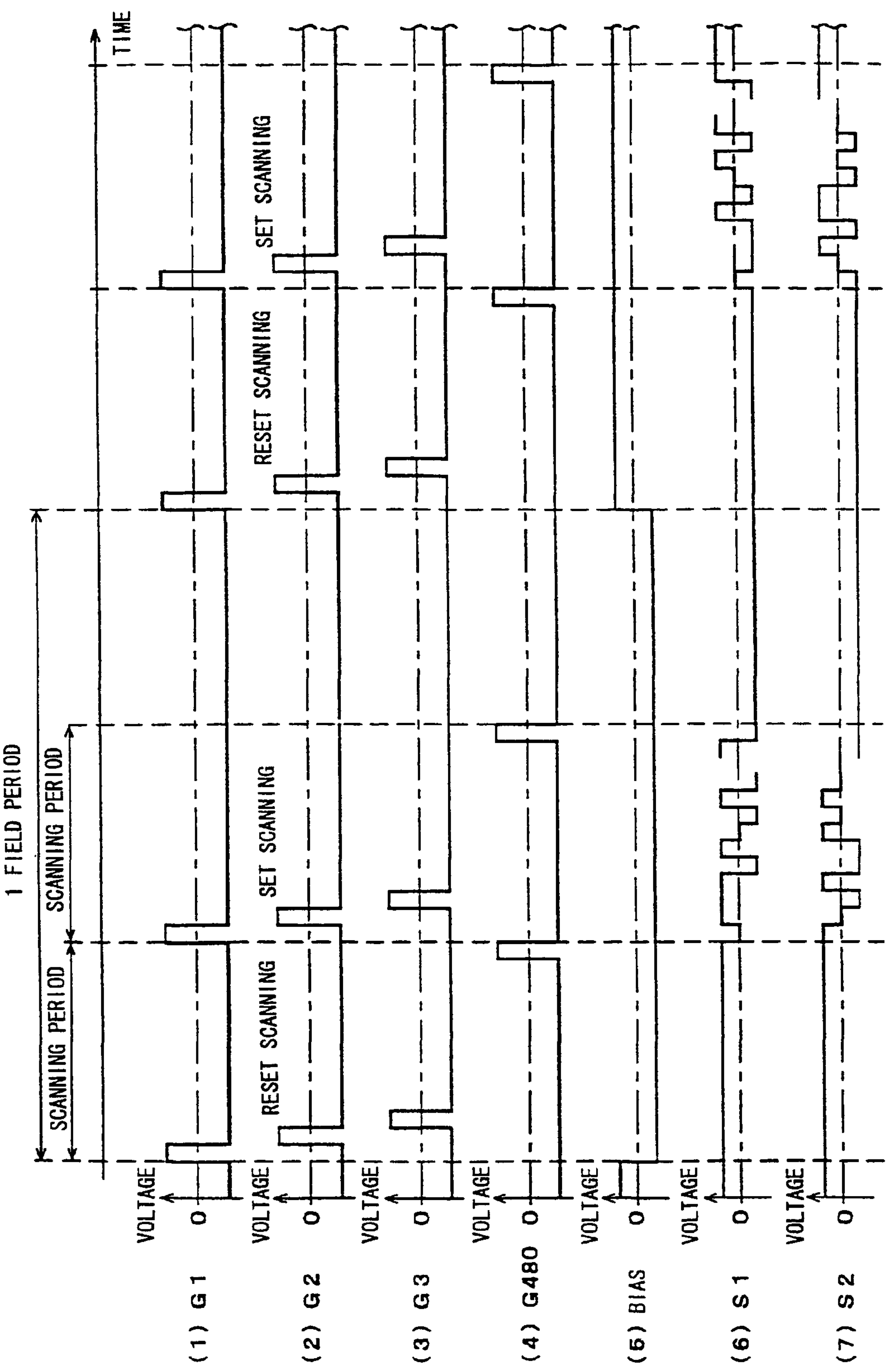
FIG. 9 is a diagram showing waveforms to drive a TFT liquid crystal panel for use in embodiment 2 in accordance with the present invention.

In the present embodiment, drive voltage is applied to electrodes of the TFT liquid crystal panel 7 in FIG. 1 according to the timing chart in FIG. 9.

Referring to the timing chart in FIG. 9, reset scanning is carried out in the first scanning period by the gate driver 2 applying a gate-ON voltage to one of the gate electrodes G1 to G480 and the source driver 1 supplying predetermined electric charge to the pixel electrodes 6 through the TFTs 5 turned on by the gate-ON voltage. The process is repeated sequentially from the gate electrode G1 to gate the electrode G480 to cover the entire display area.

Voltage is applied in, this period to the pixel electrodes 6 by means of the electric charge supplied from the source driver 1 to cause the liquid crystal on the pixel electrodes 6 to change to a dark display state.

Display scanning is carried out in the subsequent scanning period by the gate driver 2 applying a gate-ON voltage to one of the gate electrodes G1 to G480 and the source driver 1 supplying electric charge to the pixel electrodes 6 through the TFTs 5 turned on by the gate-ON voltage. The process is repeated sequentially from the gate electrode G1 to the gate electrode G480 to cover the entire display area.

Voltage is applied in this period to the pixel electrodes 6 by means of the electric charge supplied from the source driver 1 to cause the liquid crystal on the pixel electrodes 6 to change to a predetermined state (values determined according to image information).

Figure 10:
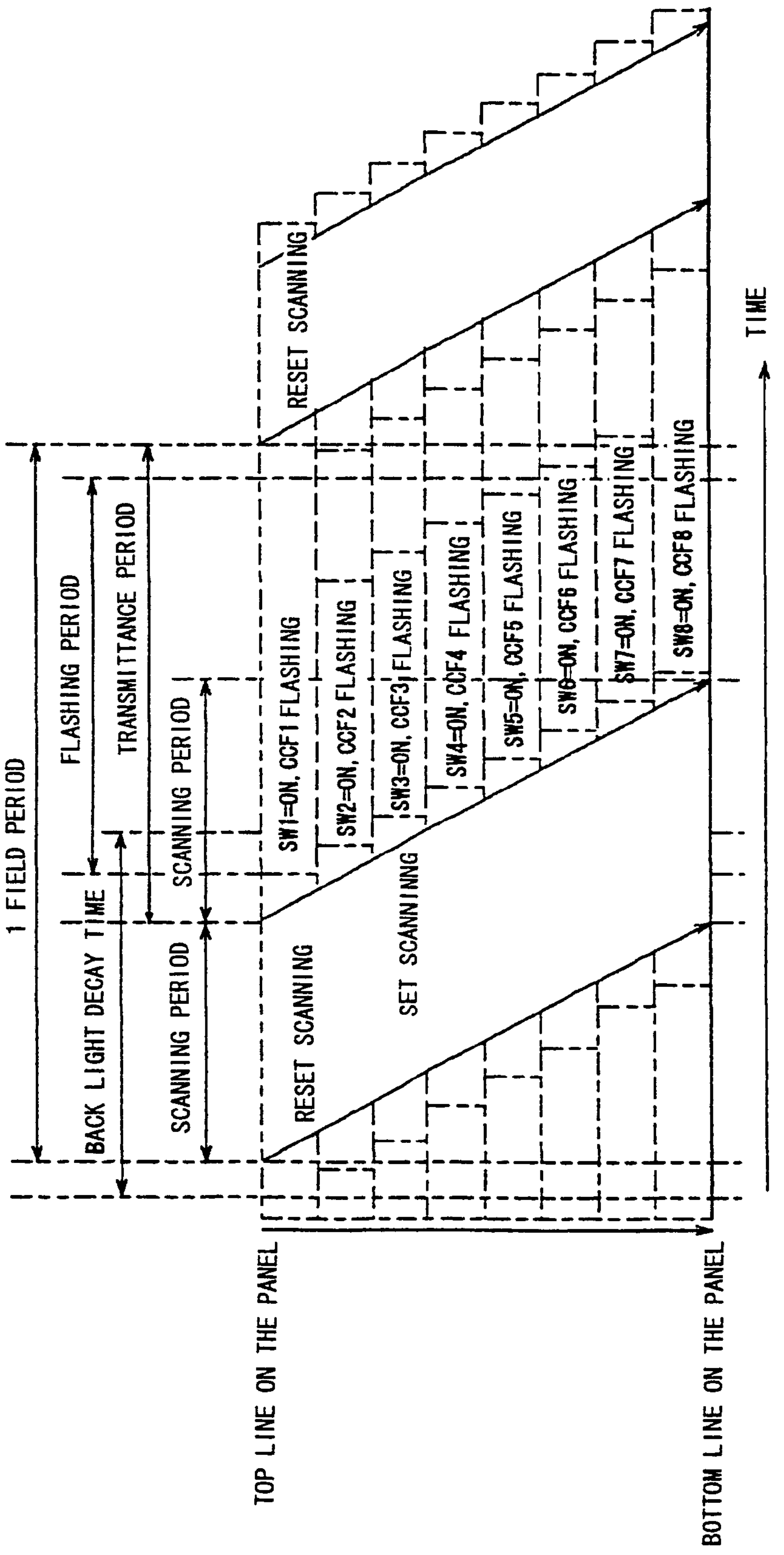
FIG. 10 is a timing chart showing the relationship between the scanning timings of a TFT liquid crystal panel and the flashing timings of a backlight for use in embodiment 2 in accordance with the present invention.

The TFT liquid crystal panel 7 is stacked on the backlight unit 12. The arrangement of the backlight unit 12 is schematically shown in FIG. 3. FIG. 10 shows turn-on/off timings of the fluorescent lamps 10 provided in the backlight unit 12 and the relationship between the reset scanning and the display scanning carried out on the TFT liquid crystal panel 7.

The fluorescent lamp 10 to illuminate the TFTs 5 on which reset scanning is being carried out is turned off roughly at the same time as the reset scanning by opening the switch 8 for use to provide power source from the inverter 9. Next, the fluorescent lamp 10 to illuminate the TFT 5s on which display scanning is being carried out is flashed roughly at the same time as the display scanning by closing the switch 8 for use to provide power source from the inverter 9.

Here, by carrying out reset scanning in the decay time tr during which the luminance of the fluorescent lamp 10 decays to 1/N of the flashing luminance, CR (contrast) can be improved over the black blanking type explained in the description above regarding prior art whereby the fluorescent lamp 10 is flashed continuously.

Supposing that the average luminance of the fluorescent lamp 10 during the reset period from the – reset scanning through the display scanning is equal to half that during the flashing period of the fluorescent lamp 10, the CR in a field period is given by equation (7):

$$CR = (\text{Fluorescent Lamp Flashing Period} \times \text{Bright Display Transmission Ratio}) / ((\text{Fluorescent Lamp Flashing Period} + \text{Reset Period}/2) \times \text{Dark Display Transmission Ratio}) \quad (7)$$

Meanwhile, the CR in a field period of a conventional black blanking type is given by equation (8):

$$CR = (\text{Display Period} \times \text{Bright Display Transmission Ratio}) / (\text{Field Period} \times \text{Dark Display Transmission Ratio}) \quad (8)$$

A comparison of equation (7) and equation (8) tells that CR (contrast) is higher in equation (7) than in equation (8) with improved display quality.

In the present embodiment, the period from the application of voltage to the first pixel electrode in a group of pixel electrodes 6 to the flashing of the fluorescent lamp 10 to illuminate the group of pixel electrodes 6 does not change significantly from group to group; therefore, similarly to embodiment 1, there is no need to wait for the liquid crystal to fully respond in the present embodiment.

Therefore, similarly to the conventional black blanking type, the display period of the present embodiment is given by equation (9):

$$\text{Display Period} = \text{Field Period} - TFT \text{ Panel Scanning Period} \quad (9)$$

Incidentally, preferably, the 1/N decay time is equal to, or less than (Field Period–Fluorescent Lamp Flashing Period) for improvement in moving-image quality. However, the 1/N decay time of the fluorescent lamp 10 in the timing chart in FIG. 10 is given by relationship equation (10):

$$1/N \text{ Decay Time} \geq \text{Field Period} - \text{Fluorescent Lamp Flashing Period} \quad (10)$$

From equation (10), it is understood that even if the 1/N decay time is equal to, or more than, (Field Period–Fluorescent Lamp Flashing Period), the present embodiment is still advantageous in improvement of CR over the use of a backlight which shines always at constant luminance. Accordingly, the decay characteristics are preferably determined based on a prescribed fluorescent lamp flashing cycle and fluorescent lamp flashing period, taking account of the CR and the illuminating efficiency of the fluorescent lamp in the panel transmittance time.

In the present embodiment, reset scanning is carried out first. Therefore, the display scanning in FIG. 10 always starts from the darkest state if the response time for the liquid crystal corresponding to the TFTs 5 to change from any given state to the darkest state is less than the scanning period due to this reset potential. As a result, the one-field DLs 13 and 15 explained in embodiment 1 in reference to FIGS. 7 and 8 are not necessary.

Similarly to embodiment 1, after voltage is applied to the first pixel electrode in a group of pixel electrodes in display scanning, the fluorescent lamp to illuminate the group of pixel electrodes may be flashed, again in the present embodiment, without having to wait for the liquid crystal to become ready to display half-tones.

However, for improved efficiency in the use of light (or to achieve increased crispness in image quality with sufficiently subdued dark state luminance), it is preferred if the fluorescent lamp is flashed only after the liquid crystal in its darkest state has fully responded and changed to its brightest state (or only after the liquid crystal in its brightest state has fully responded and changed to its darkest state).

Embodiment 3

Figure 12:
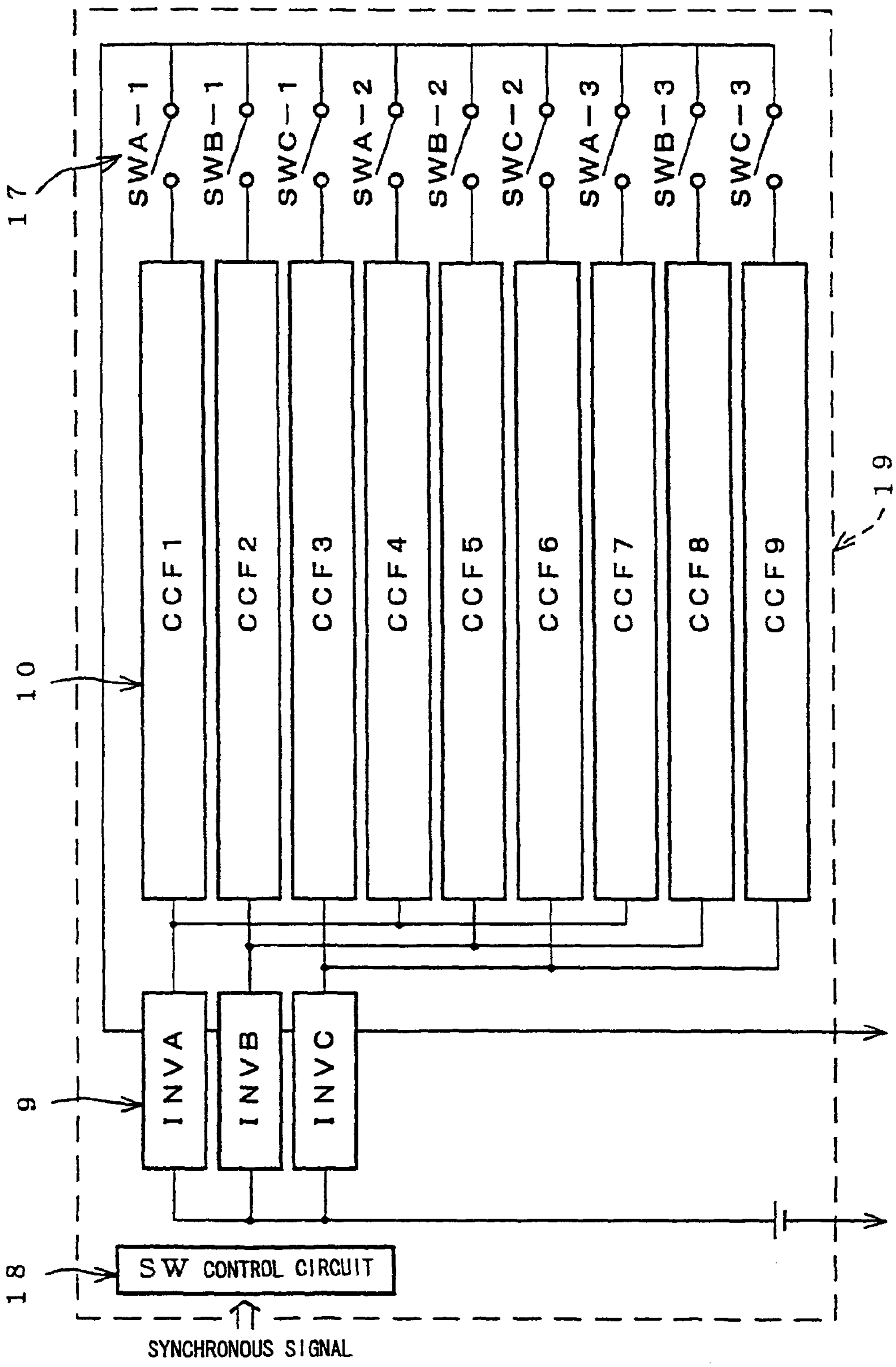
FIG. 12 is a plan view schematically showing a backlight unit for use in embodiment 3 in accordance with the present invention.

The following description will discuss another embodiment in accordance with the present invention. Here, for convenience, members of the present embodiment that have the same arrangement and function as members of any one of the previous embodiments, and that are mentioned in that embodiment are indicated by the same reference numerals and description thereof is omitted. Further, in the present embodiment, a backlight unit 19 shown in FIG. 12 is stacked as illumination means for illuminating on the backside of the TFT liquid crystal panel 7 schematically shown in FIG. 1.

Figure 11:
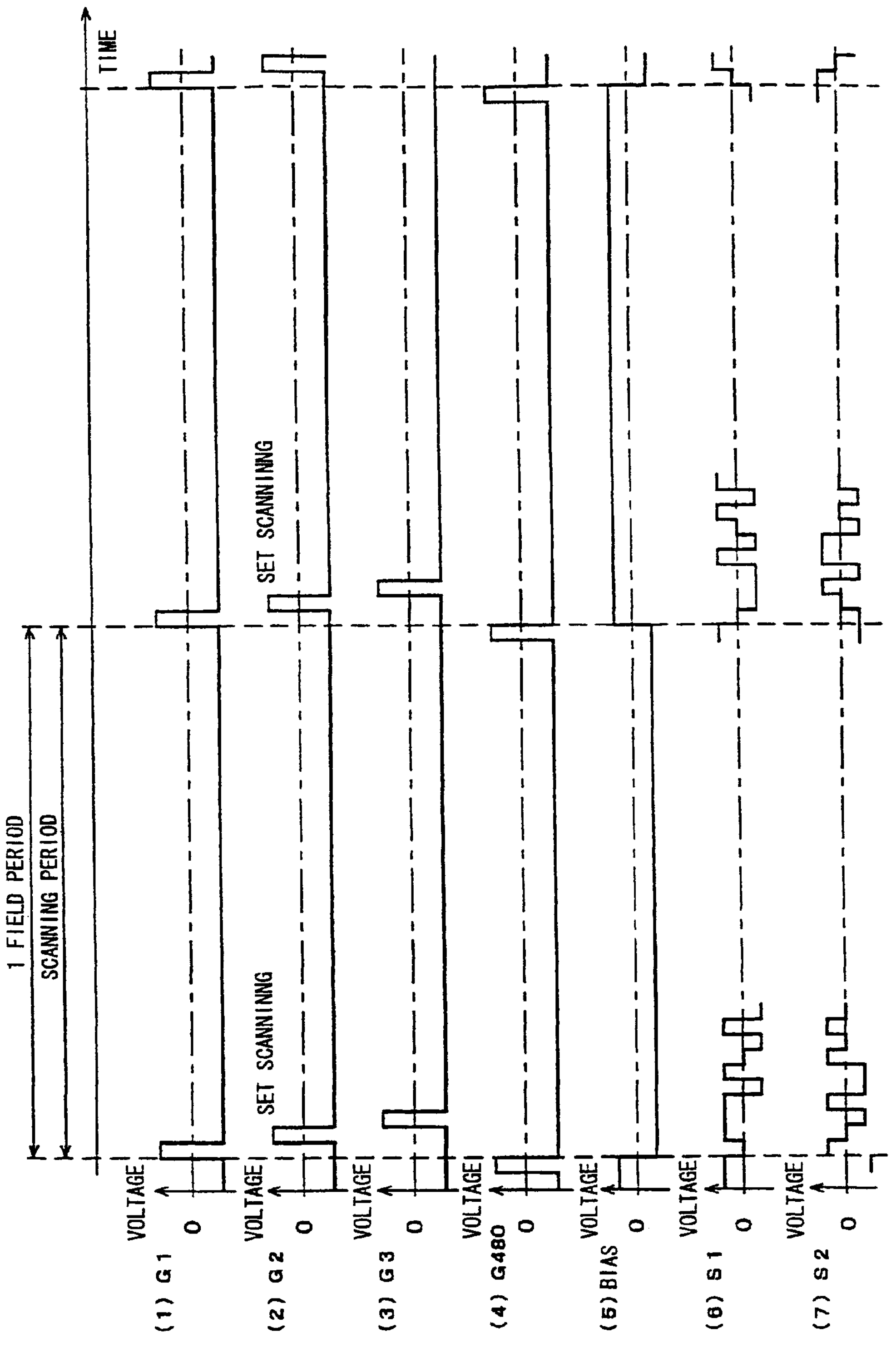
FIG. 11 is a diagram showing waveforms to drive a TFT liquid crystal panel for use in embodiment 3 in accordance with the present invention.

In a TFT liquid crystal display as the display device of the present embodiment, drive voltage is applied to the electrodes in the TFT liquid crystal panel 7 according to the timing chart constituting FIG. 11.

Specifically, display scanning is carried out by the gate driver 2 applying a gate-ON voltage to one of the gate electrodes G1 to G480 and the source driver 1 supplying electric charge to the pixel electrodes 6 through the TFTs 5 turned on by the gate-ON voltage. The process is repeated sequentially from the gate electrode G1 to the gate electrode G480 to cover the entire display area.

Voltage is applied in this period to the pixel electrodes 6 by means of the electric charge supplied from the source driver 1 to cause the liquid crystal on the pixel electrodes 6 to change to a predetermined state (values determined according to image information).

The TFT liquid crystal panel 7 subjected to such scanning is stacked on a backlight unit 19 whose arrangement is schematically shown in FIG. 12.

The backlight unit 19 is constituted by three inverters 9 (INVA, INVB, and INVC), nine fluorescent lamps 10 (CCF1 to CCF9), nine switches 17 (SWA-1 to SWA-3, SWB-1 to SWB-3, and SWC-1 to SWC-3) for closing and opening the connection between the inverters 9 and the fluorescent lamps 10, and a SW control circuit 18 for controlling the switches 17 according to a synchronization signal input from a TFT controller (not shown). The inverters 9, the fluorescent lamps 10, and the switches 17 are connect in series.

Each inverter 9 is connected in parallel to three fluorescent lamps 10. Specifically, the inverter INVA is connected to CCF1, CCF4, and CCF7, the inverter INVB to CCF2, CCF5, and CCF8, and the inverter INVC to CCF3, CCF6, and CCF9.

Figure 13:
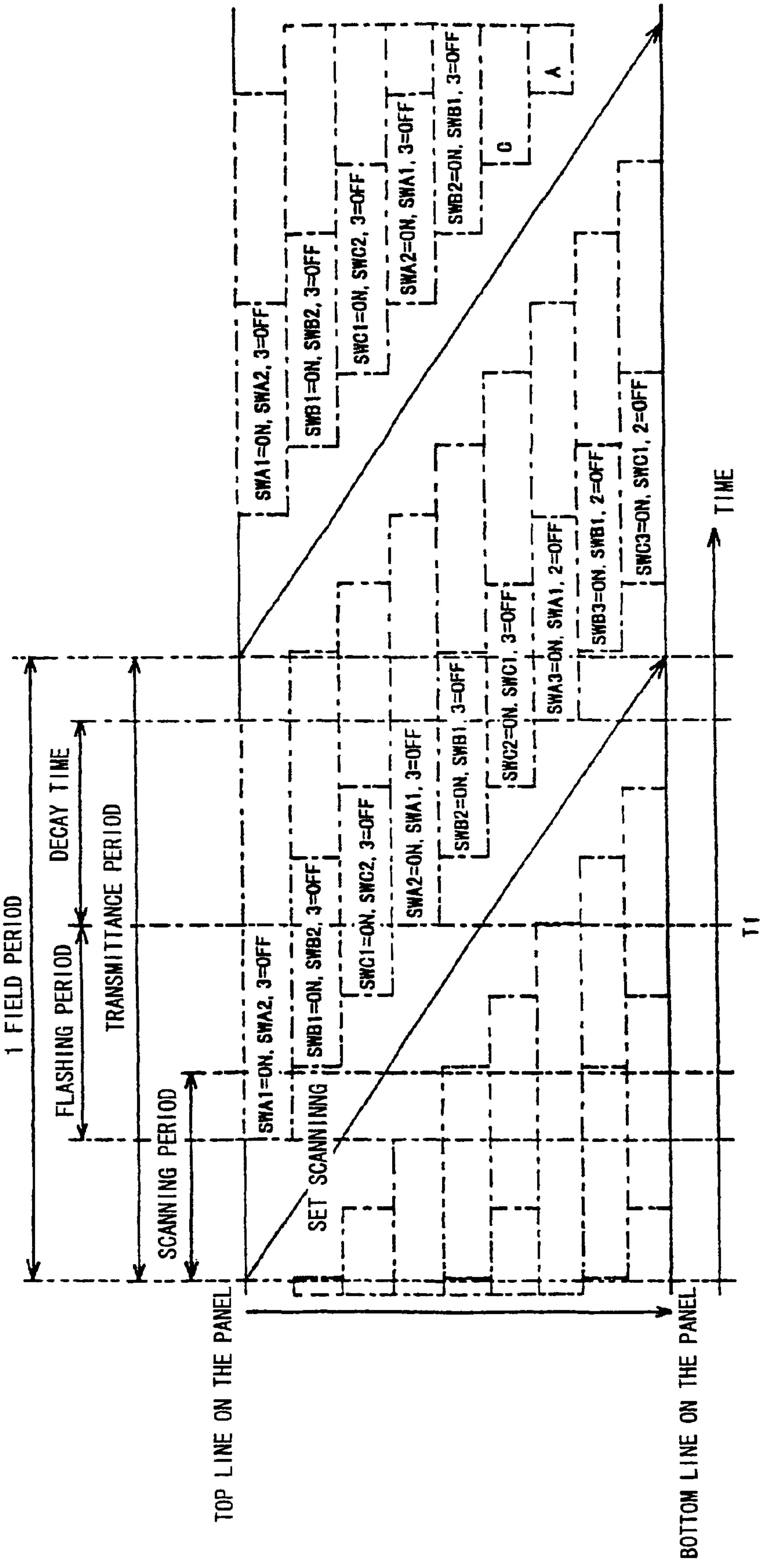
FIG. 13 is a timing chart showing the relationship between the scanning timings of a TFT liquid crystal panel and the flashing timings of a backlight for use in embodiment 3 in accordance with the present invention.

The flashing of the fluorescent lamps 10 in the backlight unit 19 arranged as above is synchronized with the display scanning of the TFT liquid crystal panel 7 as shown in FIG. 13.

The TFT liquid crystal panel 7 is divided into nine portions to which the fluorescent lamps CCF1 to CCF9 are assigned to illuminate individually. First, display scanning is carried out on pixels in the first portion. After a certain period of time has elapsed since the completion of the display scanning, the switch SWA-1 for the fluorescent lamp CCF1 assigned to illuminate those pixels on which display scanning has been carried out is closed, and simultaneously one of the switches SWA-2 and SWA-3 for the fluorescent lamps CCF4 and CCF7 which has been connected to the same inverter INVA as the fluorescent lamp CCF1 is opened. For example, the SWA-1 connected to the fluorescent lamp CCF1 is opened, and the SWA-2 connected to the fluorescent lamp CCF4 is closed concurrently at time T1 in FIG. 13. The process is repeated nine times sequentially from the fluorescent lamp CCF1 to the fluorescent lamp CCF9 to cover the entire display area, which takes one field period as shown in (1) to (4) in FIG. 11. The period from the completion of the display scanning to the closing and opening of the switches does not change significantly from lamp to lamp. In this manner, the fluorescent lamps CCF1 to CCF9 in the backlight unit 19 in FIG. 12 are sequentially flashed.

By controlling the flashing of the fluorescent lamps 10 in the backlight unit 19 in this manner, the nine fluorescent lamps 10 can be driven by three inverters 9.

In the above backlight unit 19, each switch 17 is connected in series to one of the fluorescent lamps (elongated light sources) 10 and controlled so as to cause the corresponding inverter (flash circuit) 9 to flash the fluorescent lamp 10. A point which should be noted as to the backlight unit 19 is that $$A>B \tag{11}$$

where A is the number of the fluorescent lamps 10, and B is the number of the inverters 9.

Further, since the backlight unit 19 is adapted so that the flashing of the fluorescent lamps 10 is controllable through operation of the switches 17, the number of inverters 9 required is given by inequality (12):

$$B \geqq A/C \tag{12}$$

where C is a positive real number representing a ratio of a field period to a maximum flashing periods of the fluorescent lamps 10.

The present embodiment satisfies inequality (11) with three inverters 9 and nine fluorescent lamps 10.

Conversely, given nine fluorescent lamps 10 with a flashing period set to ⅓ times the field period, inequality (12) is rewritten: B≧9/3, so B=3. This means that the backlight unit 19 needs three inverters 9.

In this manner, the TFT liquid crystal display of the present embodiment needs a relatively small number of inverters 9, compared to the backlight unit 12 in FIG. 3 used in the TFT liquid crystal display of embodiment 1.

Embodiment 4

Figure 14:
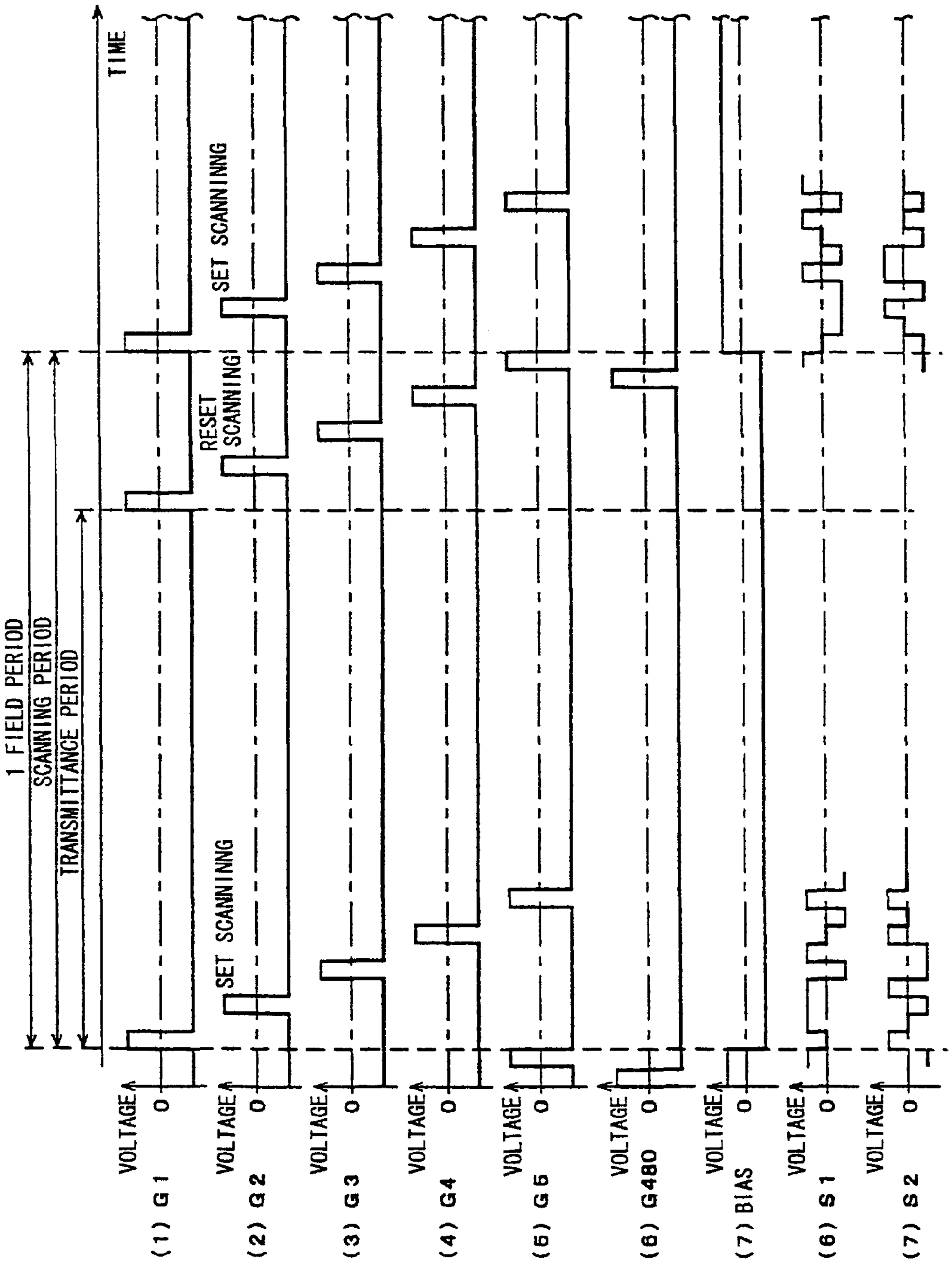
FIG. 14 is a diagram showing waveforms to drive a TFT liquid crystal panel for use in embodiment 4 in accordance with the present invention.
Figure 15:
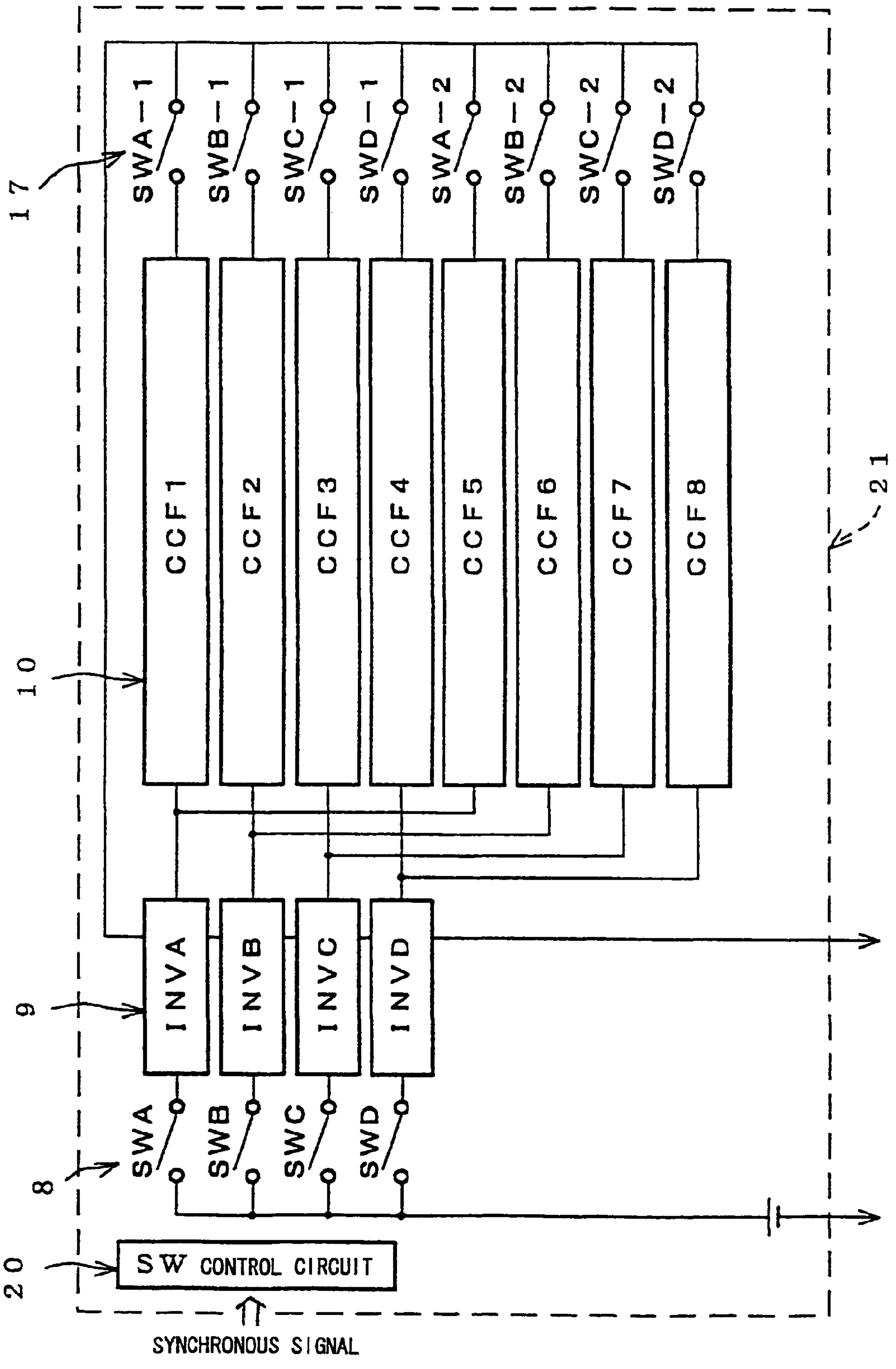
FIG. 15 is a plan view schematically showing a backlight unit for use in embodiment 4 in accordance with the present invention.

Referring to FIG. 1 and FIGS. 14 to 16, the following description will discuss another embodiment in accordance with the present invention. Here, for convenience, members of the present embodiment that have the same arrangement and function as members of any one of the previous embodiments, and that are mentioned in that embodiment are indicated by the same reference numerals and description thereof is omitted. Further, in the present embodiment, a backlight unit 21 shown in FIG. 15 is stacked as illumination means for illuminating on the backside of the TFT liquid crystal panel 7 schematically shown in FIG. 1.

In a TFT liquid crystal display as the display device of the present embodiment, drive voltage is applied to the electrodes in the TFT liquid crystal panel 7 according to the timing chart constituting FIG. 14. Under these circumstances, the scanning period is divided into a display scanning period and a reset scanning period. Drive voltage is applied to the electrodes in both periods.

Specifically, in a display scanning period, the gate driver 2 applies a gate-ON voltage to one of the gate electrodes G1 to G480, and the source driver 1 supplies electric charge to the pixel electrodes 6 through the TFTs 5 turned on by the gate-ON voltage. The application of a gate-ON voltage by the gate driver 2 takes place for a period from 2×k×t0 to (2×k+1)×t0 (t0 is a time required to charge the pixel electrodes 6 connected to a gate electrode 4, and k is an any given integer roughly equal to the identification number k of that gate electrode (e.g., k=1 for G1)).

Voltage is applied in this period to the pixel electrodes 6 by means of the electric charge supplied from the source driver 1 to cause the liquid crystal on the pixel electrodes 6 to change to a predetermined state (values determined according to image information).

In the reset scanning period following the display scanning period, the gate driver 2 applies a gate-ON voltage to one of the gate electrodes G1 to G480, and the source driver 1 supplies electric charge to the pixel electrodes 6 through the TFTs 5 turned on by the gate-ON voltage. The application of a gate-ON voltage by the gate driver 2 takes place for a period from (2×k+1)×t0 to (2+1)×k×t0.

Here, the application of the gate-ON voltage to one of the gate electrodes 4 is switched every period to for alternate use in display scanning and reset scanning. By providing a function to carry out such scanning and set voltage to be supplied to the source driver 1 during reset scanning independently from data signals, the data required to display moving images can be transferred to the source driver 1 in (Display Scanning Period+Reset Scanning Period)×2×t0; in this manner, the source driver 1 only needs a lowered clock frequency for data transfer.

The TFT liquid crystal panel 7 subjected to such scanning is stacked on a backlight unit 21 whose arrangement is schematically shown in FIG. 15.

The backlight unit 21 is constituted by four inverters 9 (INVA, INVB, INVC, and INVD), eight fluorescent lamps 10 (CCF1 to CCF8), switches 8 for turning of/off the inverters 9, eight switches 17 for closing and opening the connection between the inverters 9 and the fluorescent lamps 10, and a SW control circuit 20 for controlling the switches 8 and 17 according to a synchronization signal input from a TFT controller (not shown). The switches 8, the inverters 9, the fluorescent lamps 10, and the switches 17 are connect in series.

Each inverter 9 is connected in parallel to two fluorescent lamps 10. Specifically, the inverter INVA is connected to CCF1 and CCF5, the inverter INVB to CCF2 and CCF6, the inverter INVC to CCF3 and CCF7, and the inverter INVD to CCF 4 and CCF8.

In the backlight unit 21, eight fluorescent lamps 10 are used to set the maximum flashing period of the fluorescent lamps 10 to half the field period. Therefore, the number, B, of inverters 9 is obtained from inequality (12) which is rewritten as:

$$B \geqq 8/2 \tag{13}$$

From inequality (13), B=4. This means that at least four inverters 9 are necessary to flash eight fluorescent lamps 10. In this manner, the TFT liquid crystal display of the present embodiment needs a relatively small number of inverters 9, compared to the backlight unit 12 in FIG. 3 detailed in embodiment 1.

Figure 16:
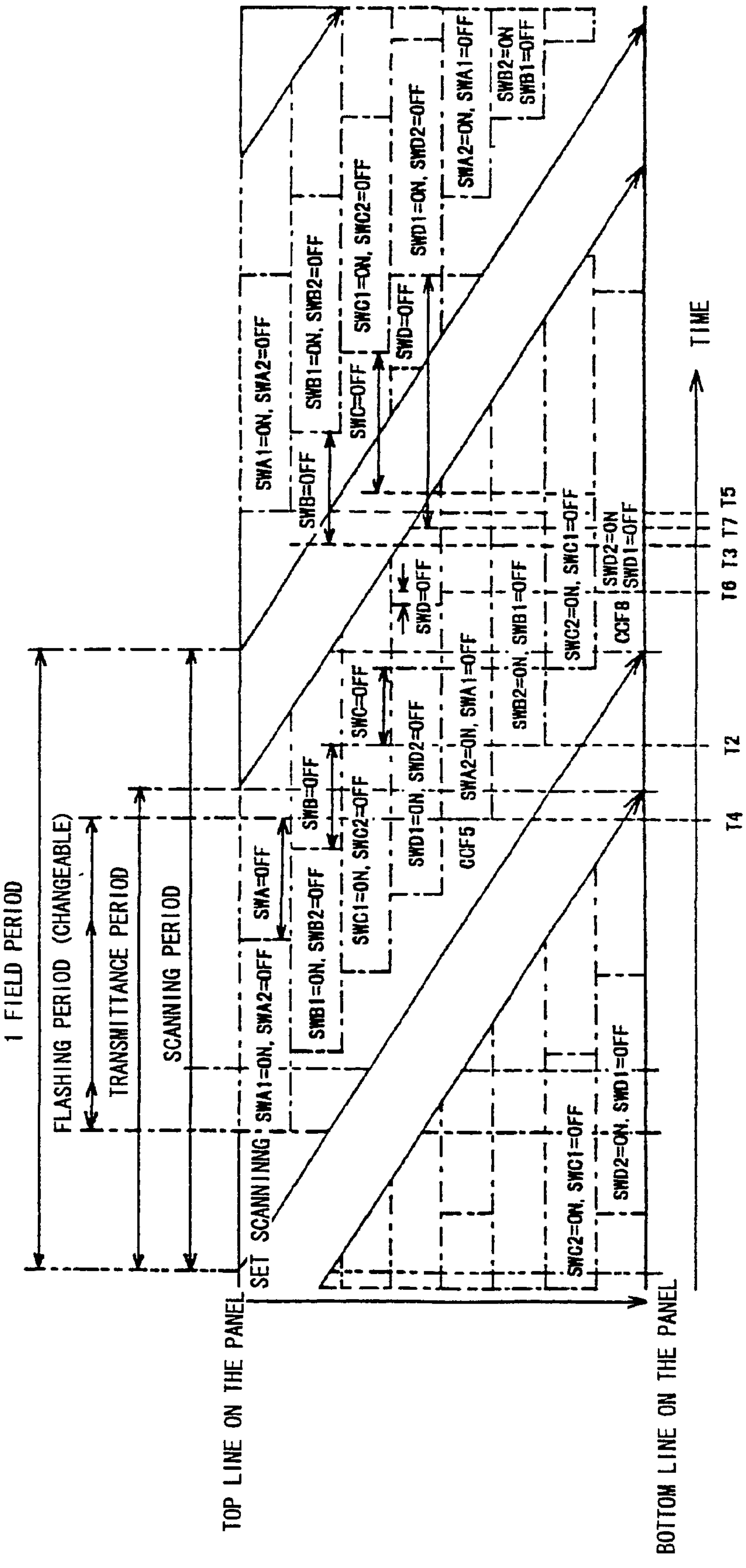
FIG. 16 is a timing chart showing the relationship between the scanning timings of a TFT liquid crystal panel and the flashing timings of a backlight for use in embodiment 4 in accordance with the present invention.
Figure 17:
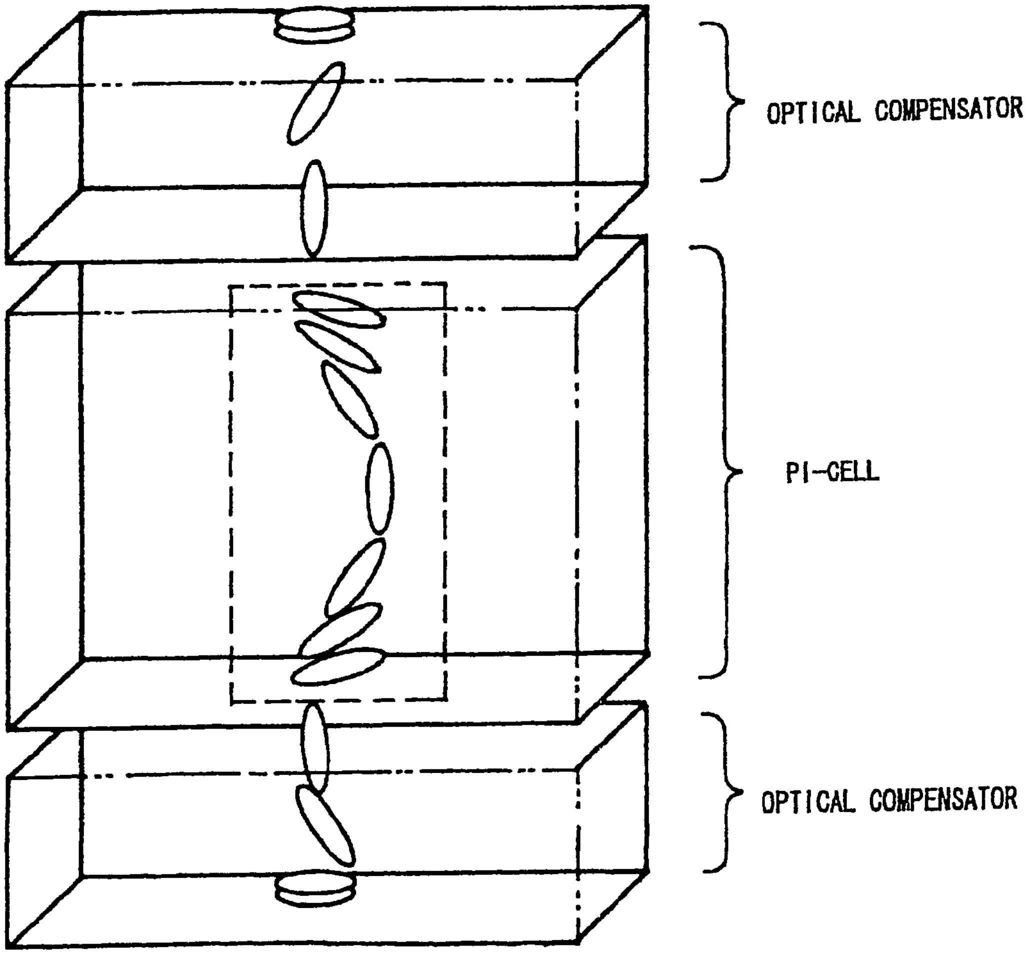
FIG. 17 PRIOR ART
FIG. 17 is an explanatory drawing showing a liquid crystal molecule model in a Pi-cell structure.
Figure 18B:
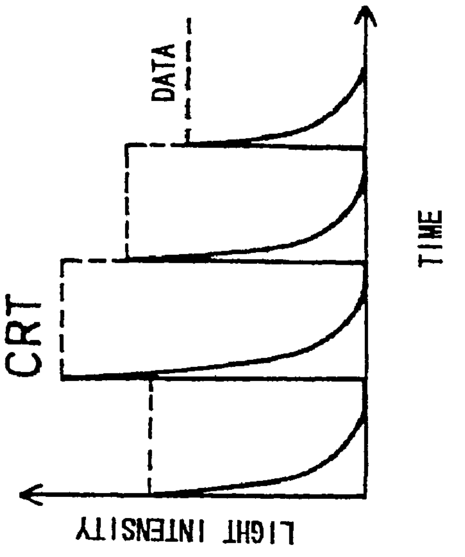
FIG. 18b PRIOR ART
FIGS. 18*a* and 18*b* are explanatory drawings showing the illuminating characteristics of a CRT.
Figure 18A:
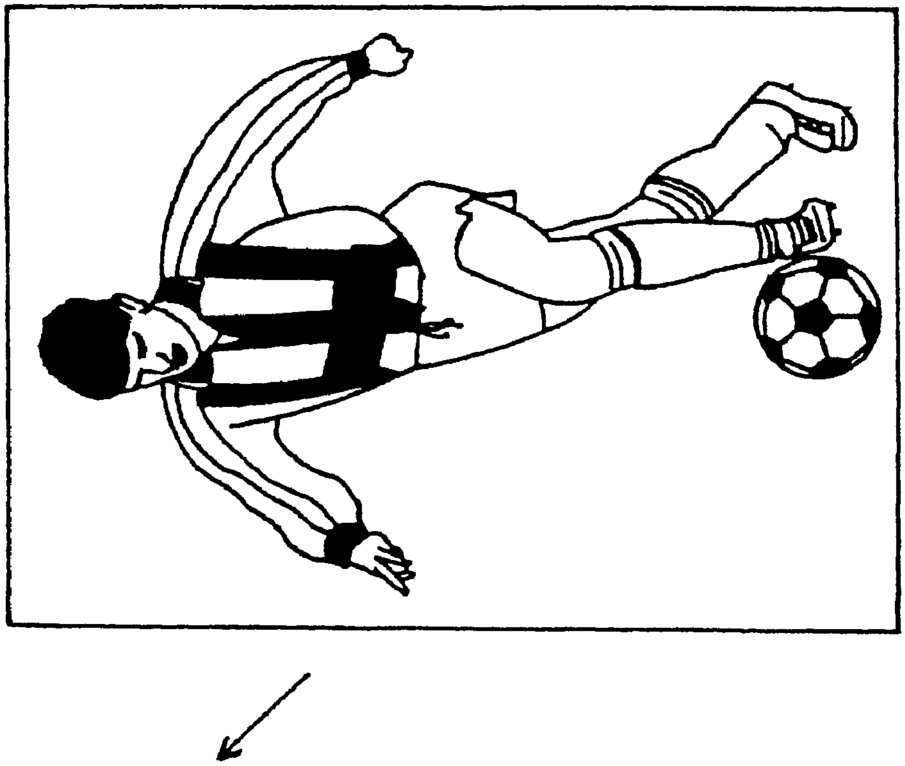
FIG. 18a PRIOR ART
Figure 19B:
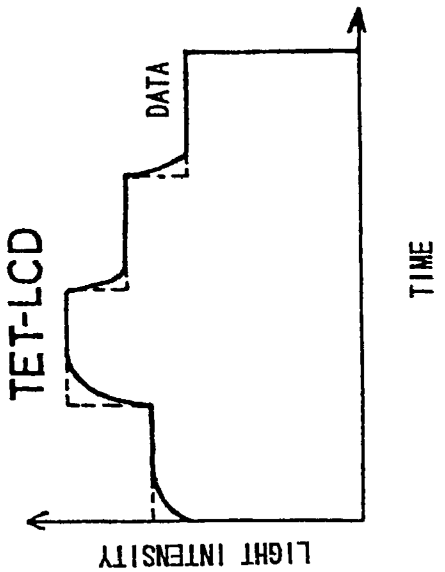
FIG. 19b PRIOR ART
FIGS. 19*a* and 19*b* are explanatory drawings showing the illuminating characteristics of a TFT-LCD.
Figure 19A:
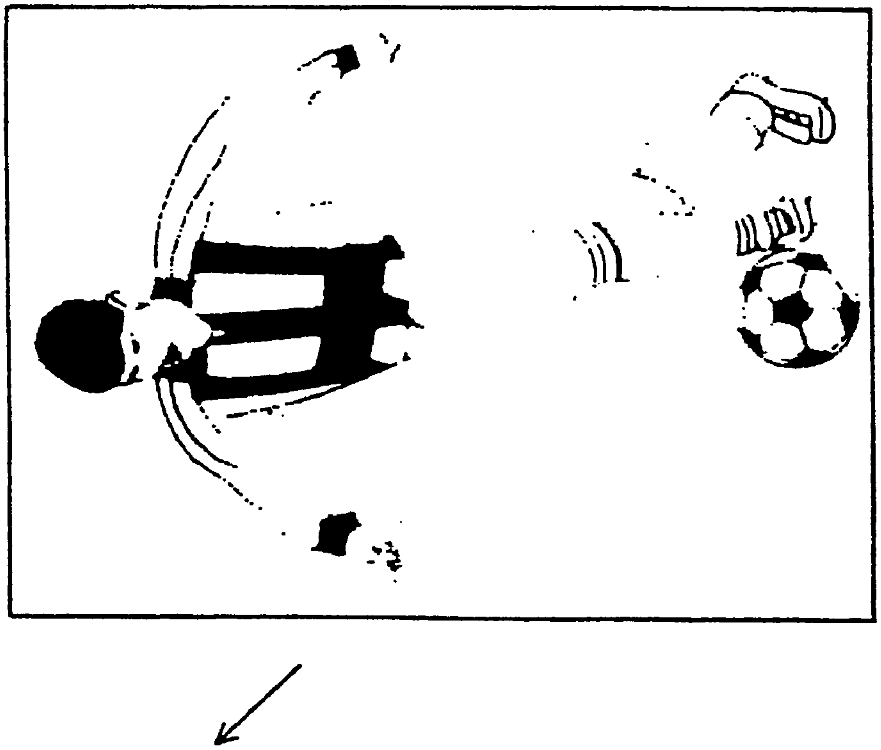
FIG. 19a PRIOR ART
Figures 21A, 21B:
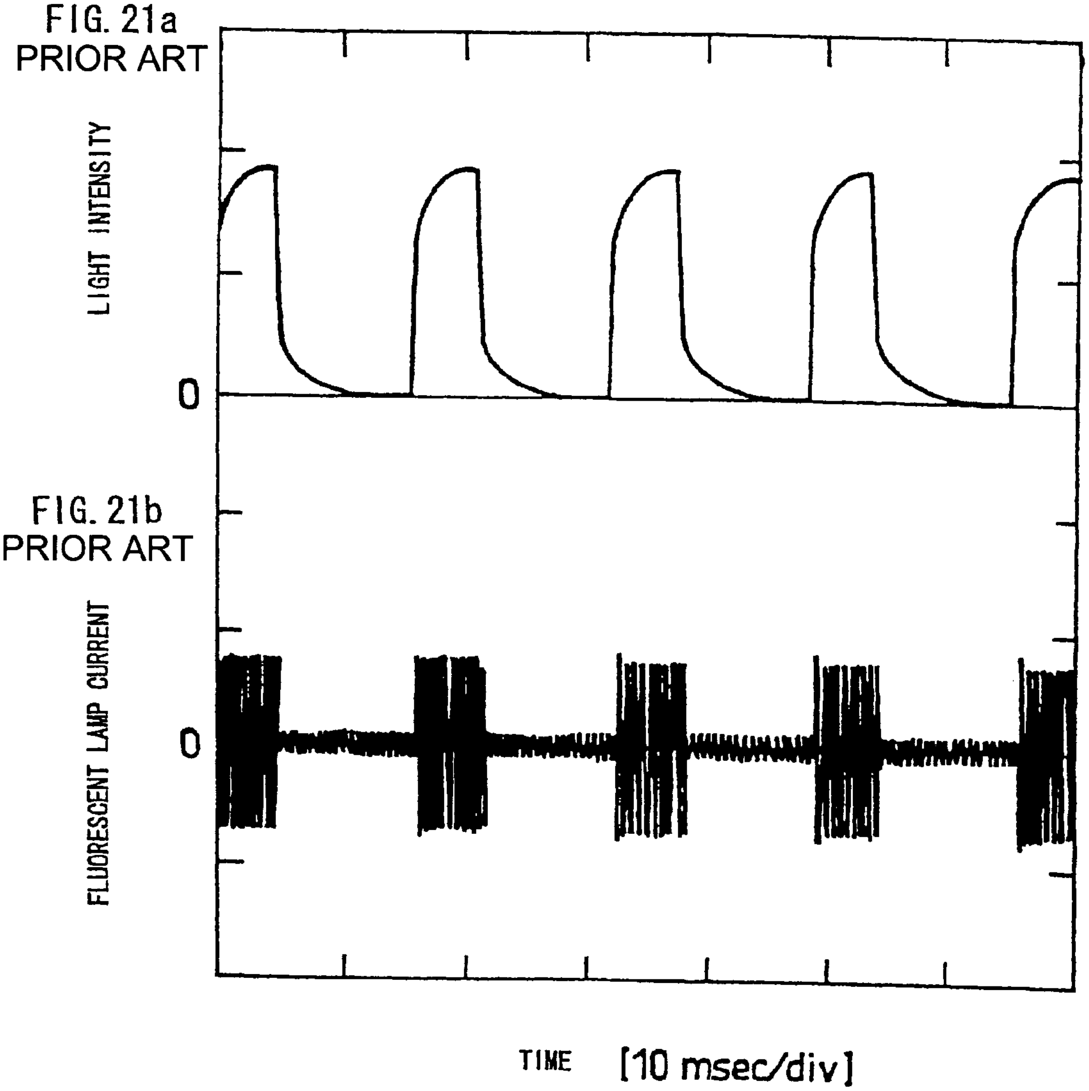
FIG. 21a PRIOR ART
FIG. 21b PRIOR ART
FIGS. 21*a* and 21*b* are explanatory drawings showing illuminating characteristics of a fluorescent lamp for use in the first method shown in FIGS. 20*a* to 22*d.*
Figure 22A:
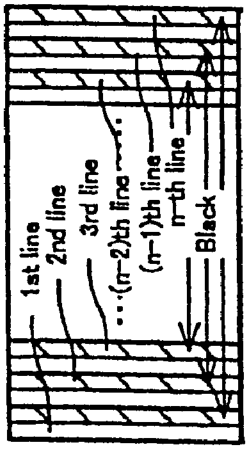
FIG. 22a PRIOR ART
FIGS. 22*a* to 22*d* are explanatory drawings showing a second method to impart impulse-type illuminating characteristics to conventional LCDs.
Figure 22B:
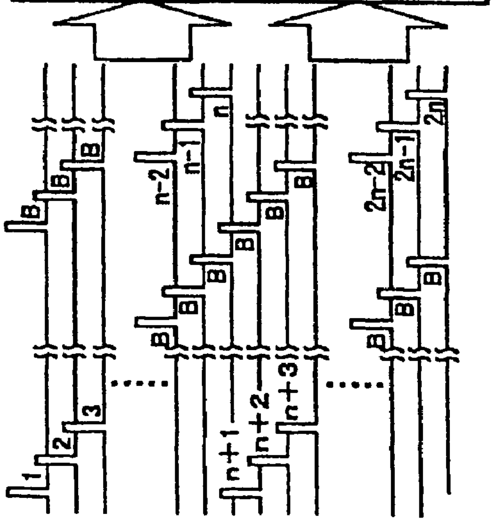
FIG. 22b PRIOR ART
Figure 22C:
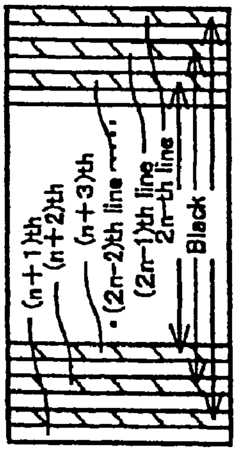
FIG. 22c PRIOR ART
Figure 22D:
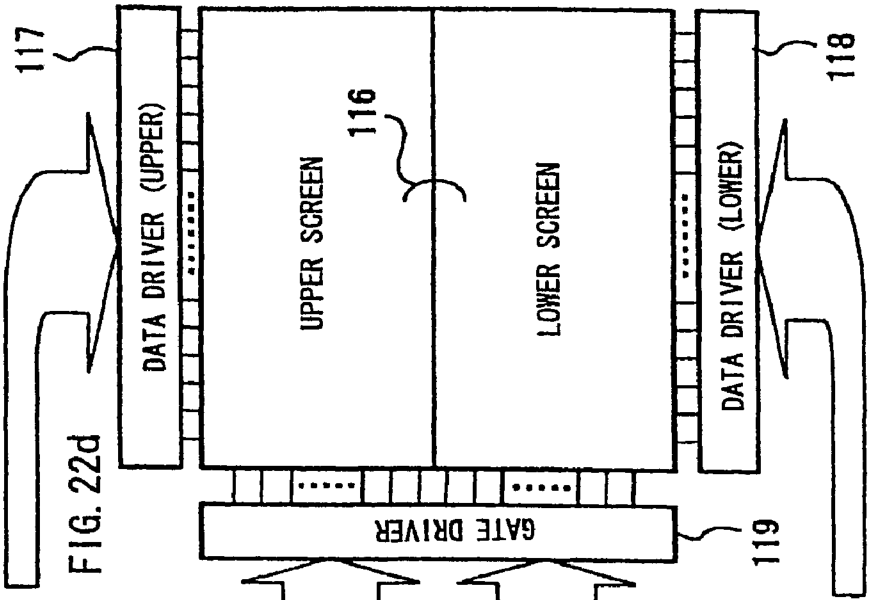
Figure 23A:
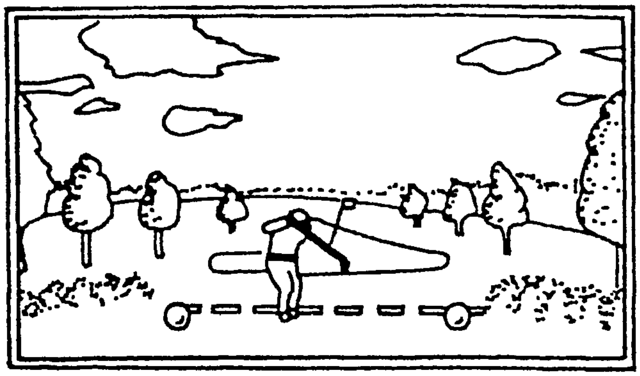
FIG. 23a PRIOR ART
FIGS. 23*a* to 23*d* are explanatory drawings showing nature of a display according to the second method shown in FIGS. 22*a* to 22*d.*
Figure 23B:
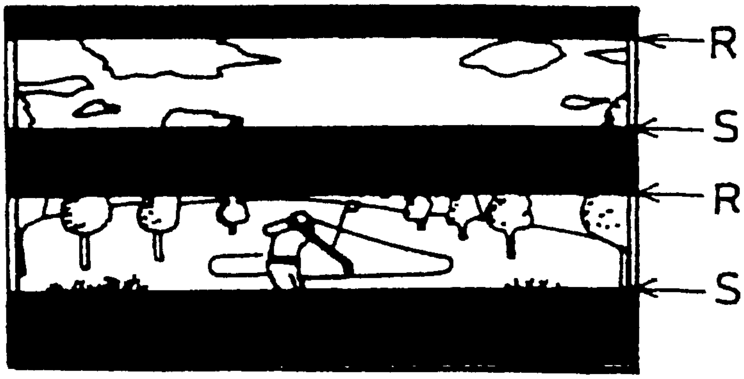
FIG. 23b PRIOR ART
Figure 23C:
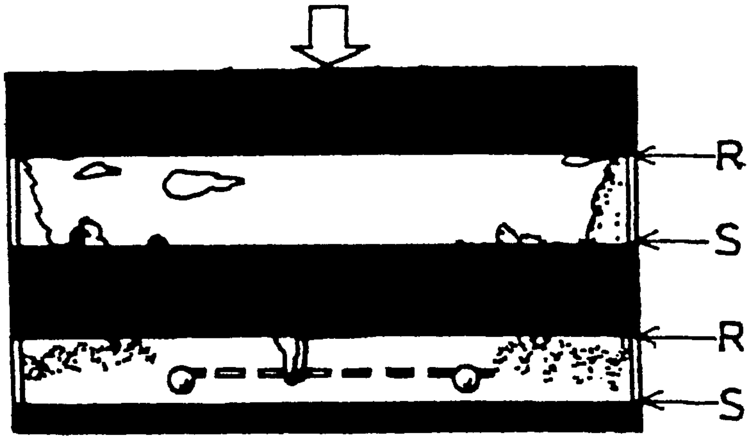
FIG. 23c PRIOR ART
Figure 23D:
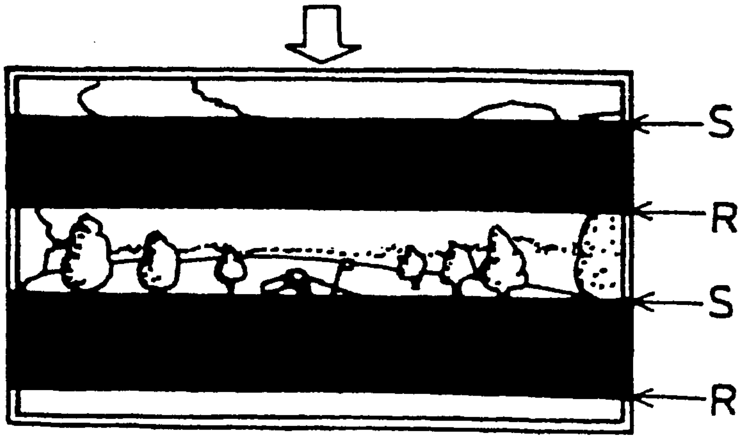
FIG. 23d PRIOR ART
Figure 24:
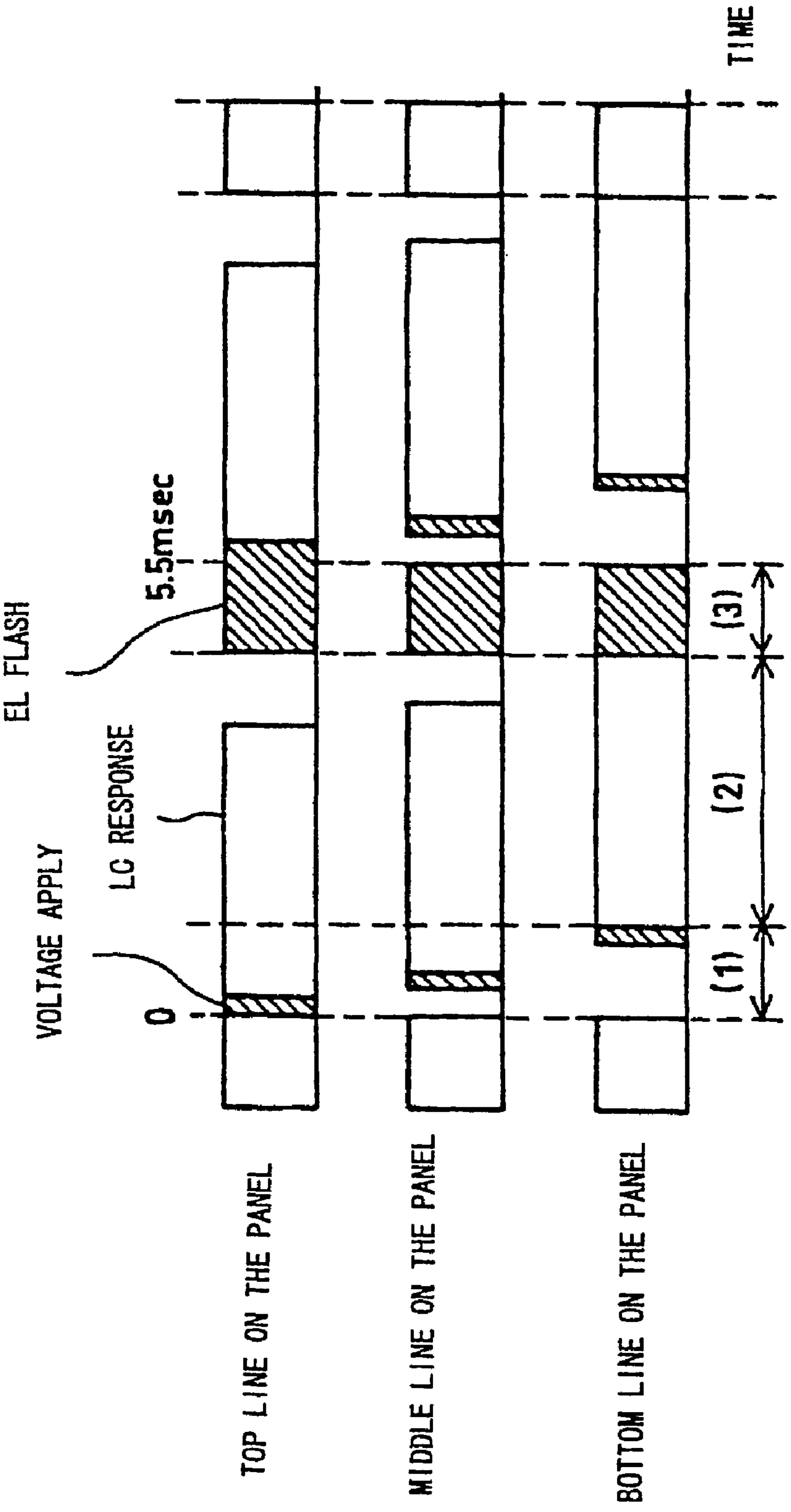
FIG. 24 PRIOR ART
FIG. 24 is an explanatory drawing showing a time sequence according to a field-sequential-color driving method.
Figure 25:
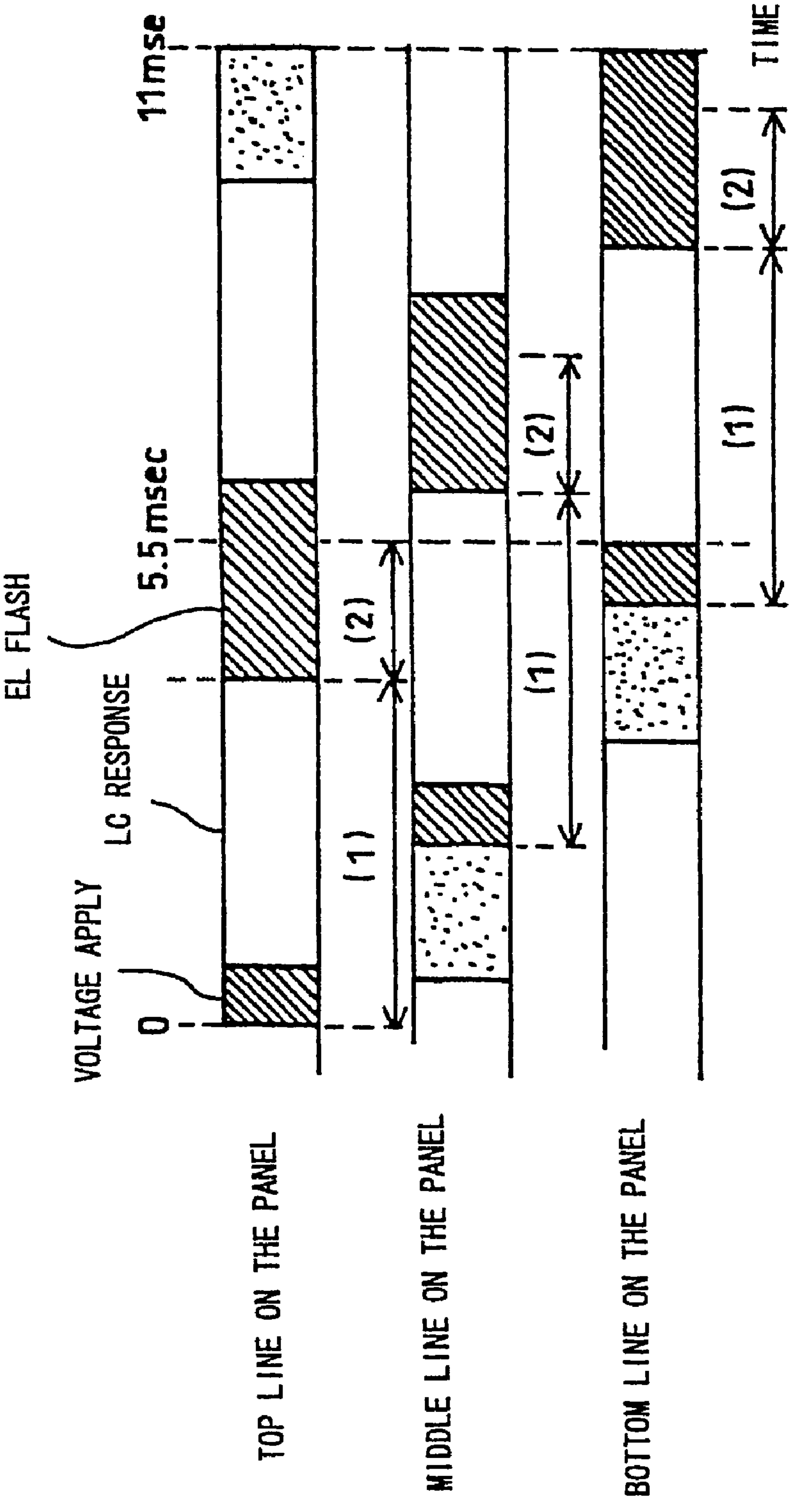
FIG. 25 PRIOR ART
FIG. 25 is an explanatory drawing showing another time sequence according to a field-sequential-color driving method.
Figure 26:
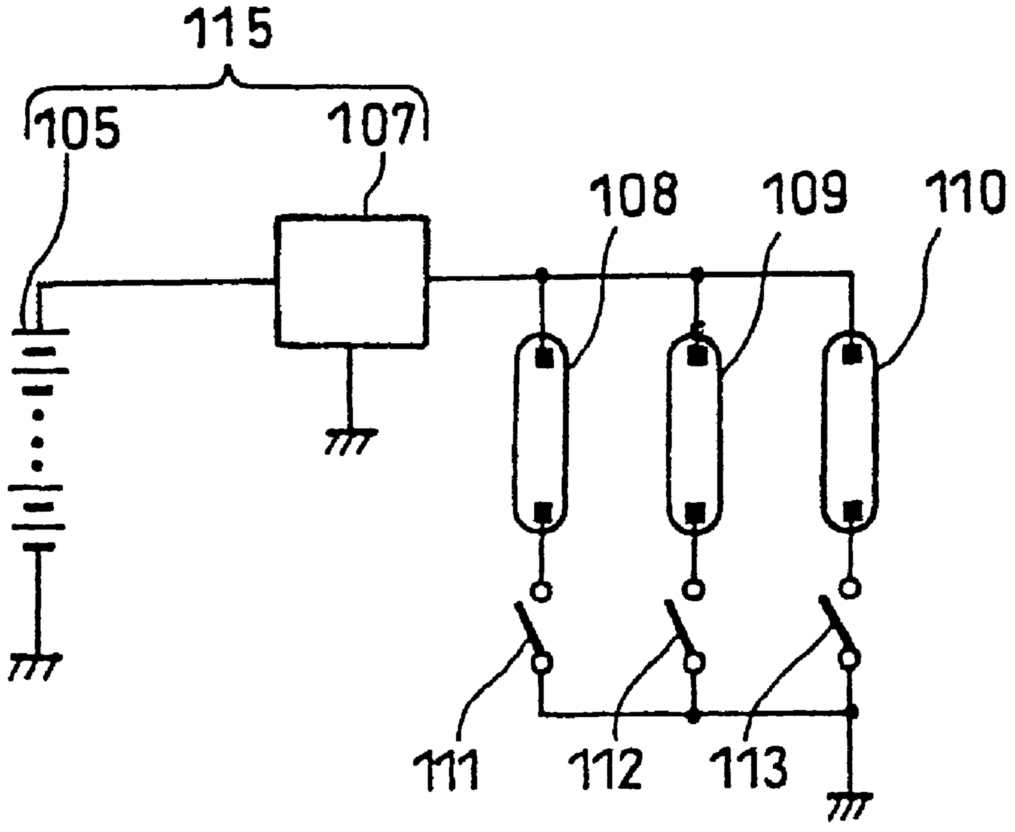
FIG. 26 PRIOR ART
FIG. 26 is a diagram showing a constitution of a backlight unit for use in a field-sequential-color display.
Figure 27:
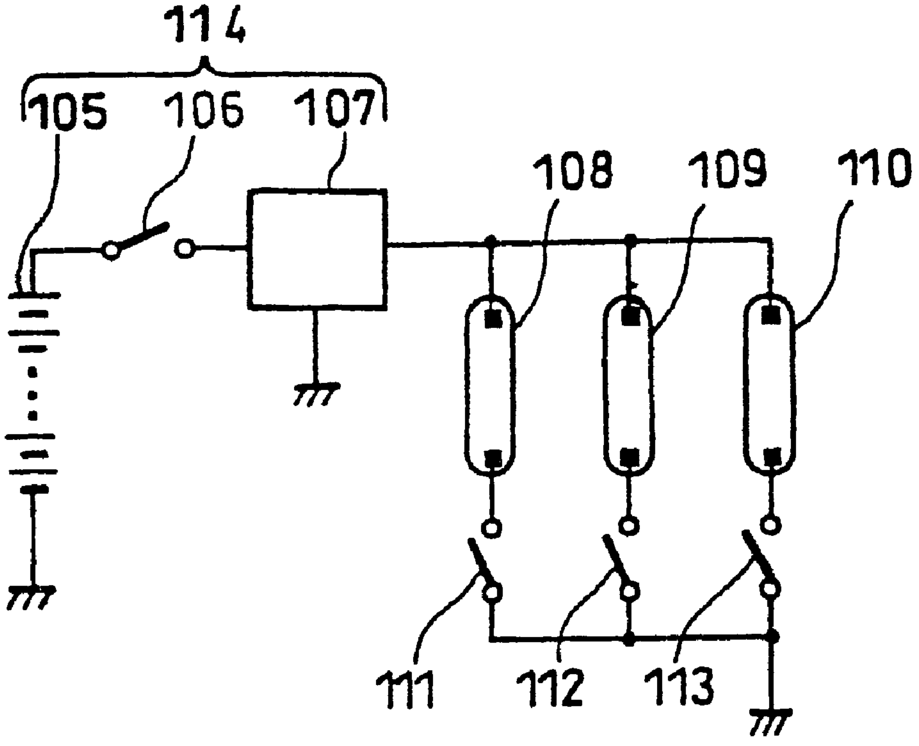
FIG. 27 PRIOR ART
FIG. 27 is a diagram showing another constitution of a backlight unit in a field-sequential-color display.
Figure 28:
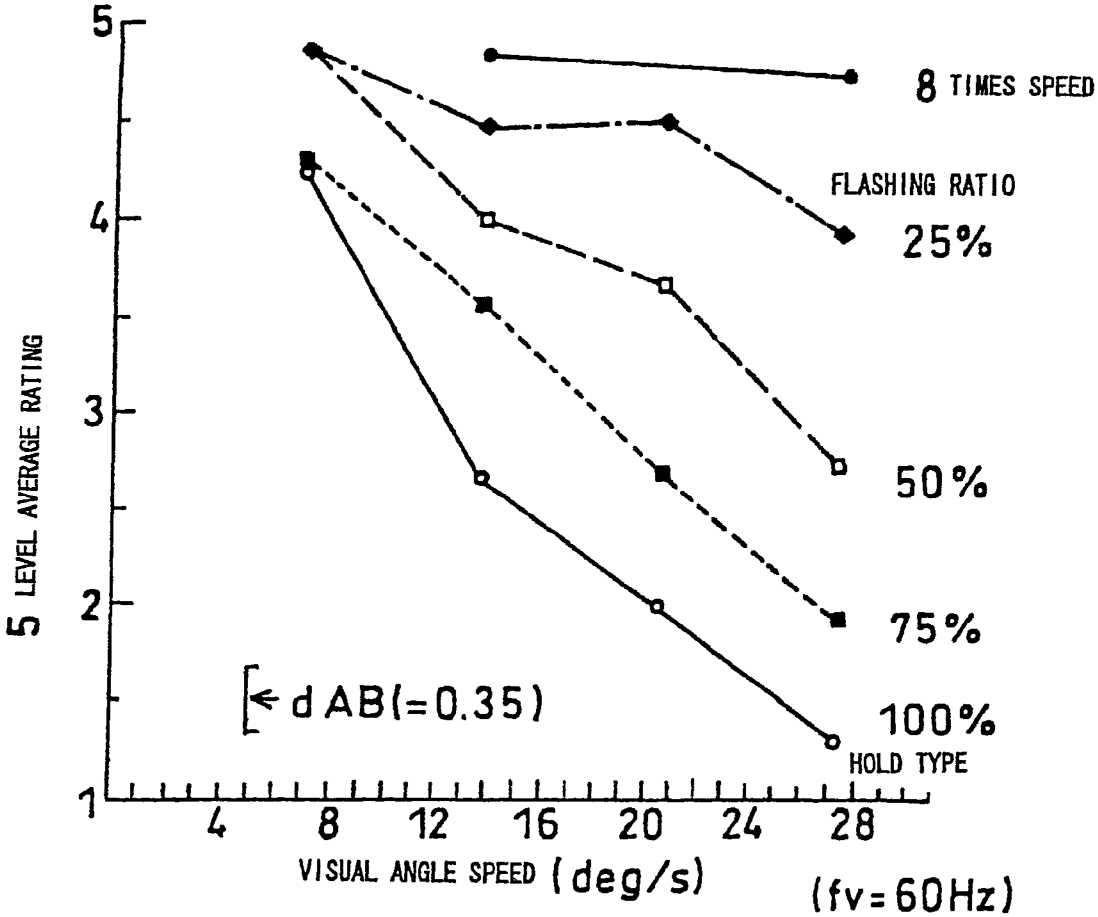
FIG. 28 PRIOR ART
FIG. 28 is a graph showing the relationship between the flashing ratios of an LCD and results of subjective evaluations of image quality.
Figure 29:
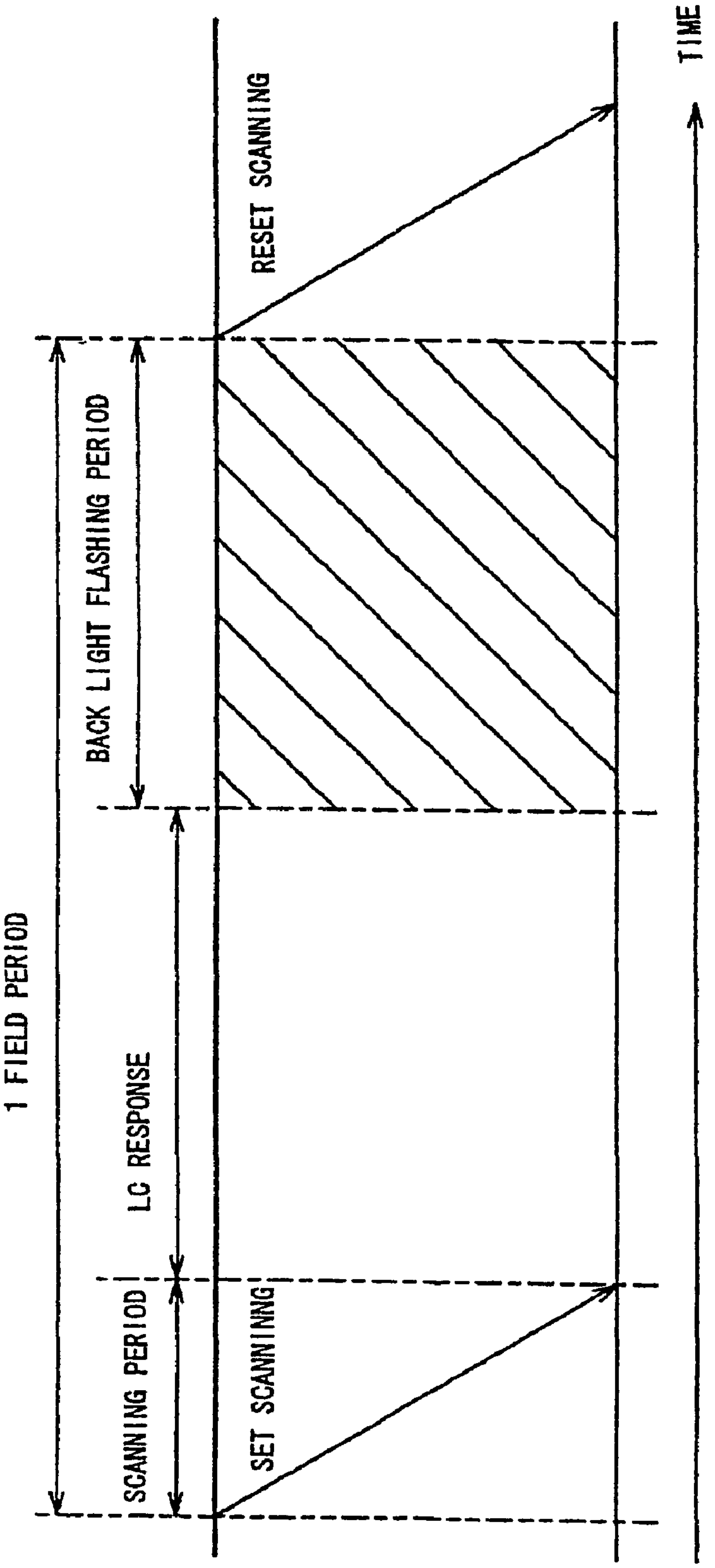
FIG. 29 PRIOR ART
FIG. 29 is a timing chart showing the relationship between the scanning timings of a TFT liquid crystal panel and the flashing timings of a backlight according to the first method shown in FIGS. 20*a* to 20*d.*
Figure 30:
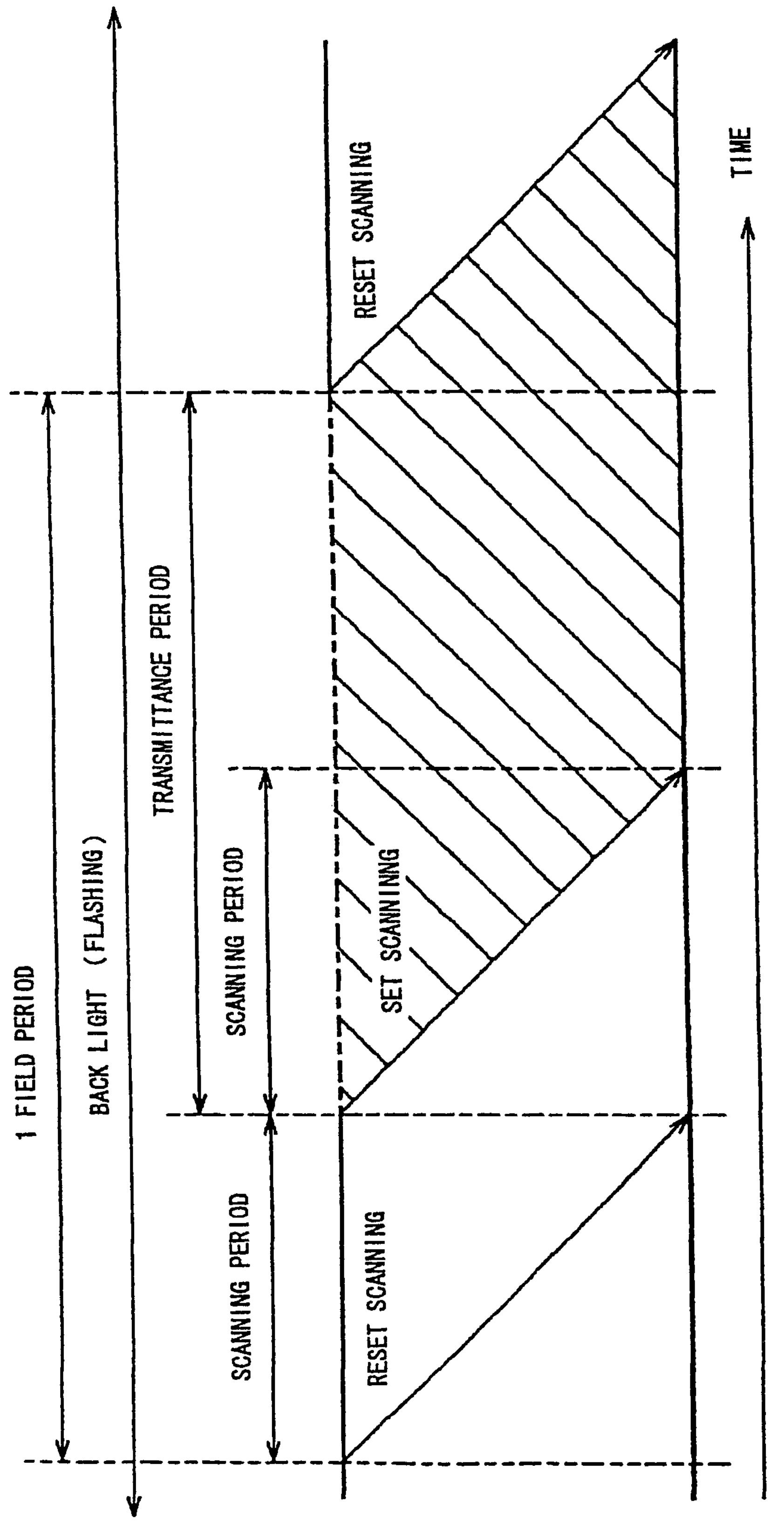
FIG. 30 PRIOR ART
FIG. 30 is a timing chart showing the relationship between the scanning timings of a TFT liquid crystal panel and the flashing timings of a backlight according to the second method shown in FIGS. 22*a* to 22*d.*

The flashing of the fluorescent lamps 10 in the backlight unit 21 arranged as above is synchronized with the display scanning of the TFT liquid crystal panel 7 as shown in FIG. 16.

The TFT liquid crystal panel 7 is divided into eight portions to which the fluorescent lamps CCF1 to CCF8 are assigned to illuminate individually. First, display scanning is carried out on pixels in the first portion. After a certain period of time has elapsed since the completion of the display scanning, the switch SWA-1 for the fluorescent lamp CCF1 assigned to illuminate those pixels in the first portion and the switch SWA for use to provide power source from the inverter INVA to the fluorescent lamp CCF1 are closed. At time T2, the switches SWA-2 and SWB are closed. The process is repeated eight times sequentially from the fluorescent lamp CCF1 to the fluorescent lamp CCF8 to cover the entire display area, which takes one field period.

The flashing period of the fluorescent lamps 10 are varied from 0 to half the field period according to the amplitude of video signals from which an image is displayed by the TFT pixel corresponding to the fluorescent lamp 10.

After the variable flashing period, the switch 8 for use to provide power source from the inverter 9 to the fluorescent lamp 10 is opened (for example, the switch SWB is opened at time T3). The switch 17 for the fluorescent lamp 10 is also opened (for example, the switch SWB-2 is opened at time T3). Here, the maximum luminance is variable from lamp to lamp. By varying the flashing period from portion to portion illuminated by the fluorescent lamp according to the information to be displayed in that portion, a high CR becomes available through the display screen. A specific example to vary the maximum luminance from portion to portion appears in FIG. 16, in which the fluorescent lamp CCF5 is flashed from time T4 to time T5, and in contrast the fluorescent lamp CCF8 is flashed only from time T6 to time T7.

It is preferred in many cases if the flashing period of the fluorescent lamp 10 is in direct proportion to the maximum luminance of the display signal of the portion to be illuminated by that fluorescent lamp 10. In the present embodiment, the flashing period of the fluorescent lamp 10 is varied in direct proportion to the maximum luminance of the display signal for the portion to be illuminated by the fluorescent lamp 10; however, it is also possible to vary light intensity of the fluorescent lamp 10 by varying the output voltage supplied from the inverter to the fluorescent lamp 10.

Figure 31:
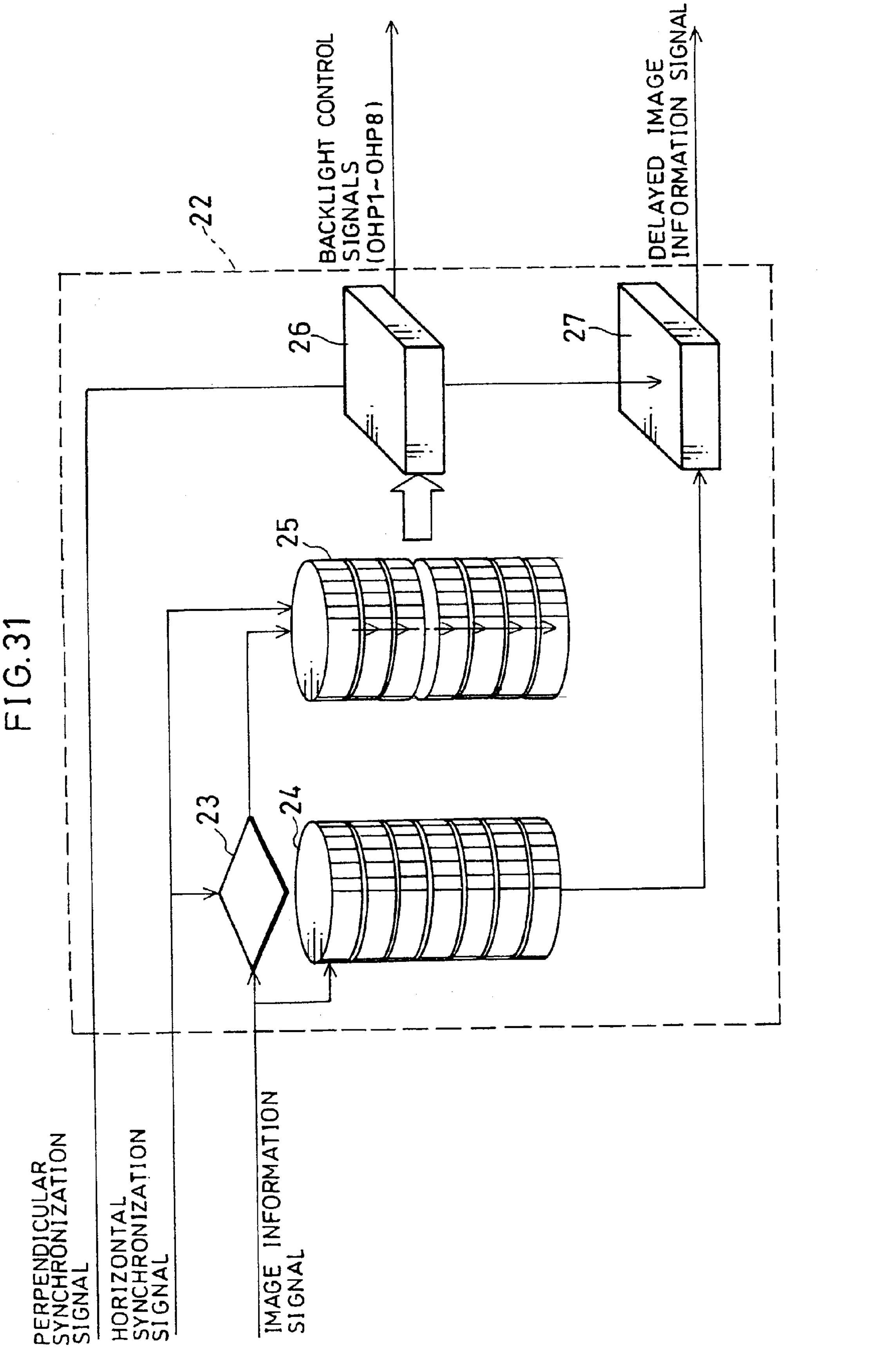
FIG. 31 is a block diagram schematically showing a control circuit for a backlight unit for use in embodiment 4 in accordance with the present invention.
Figure 32:
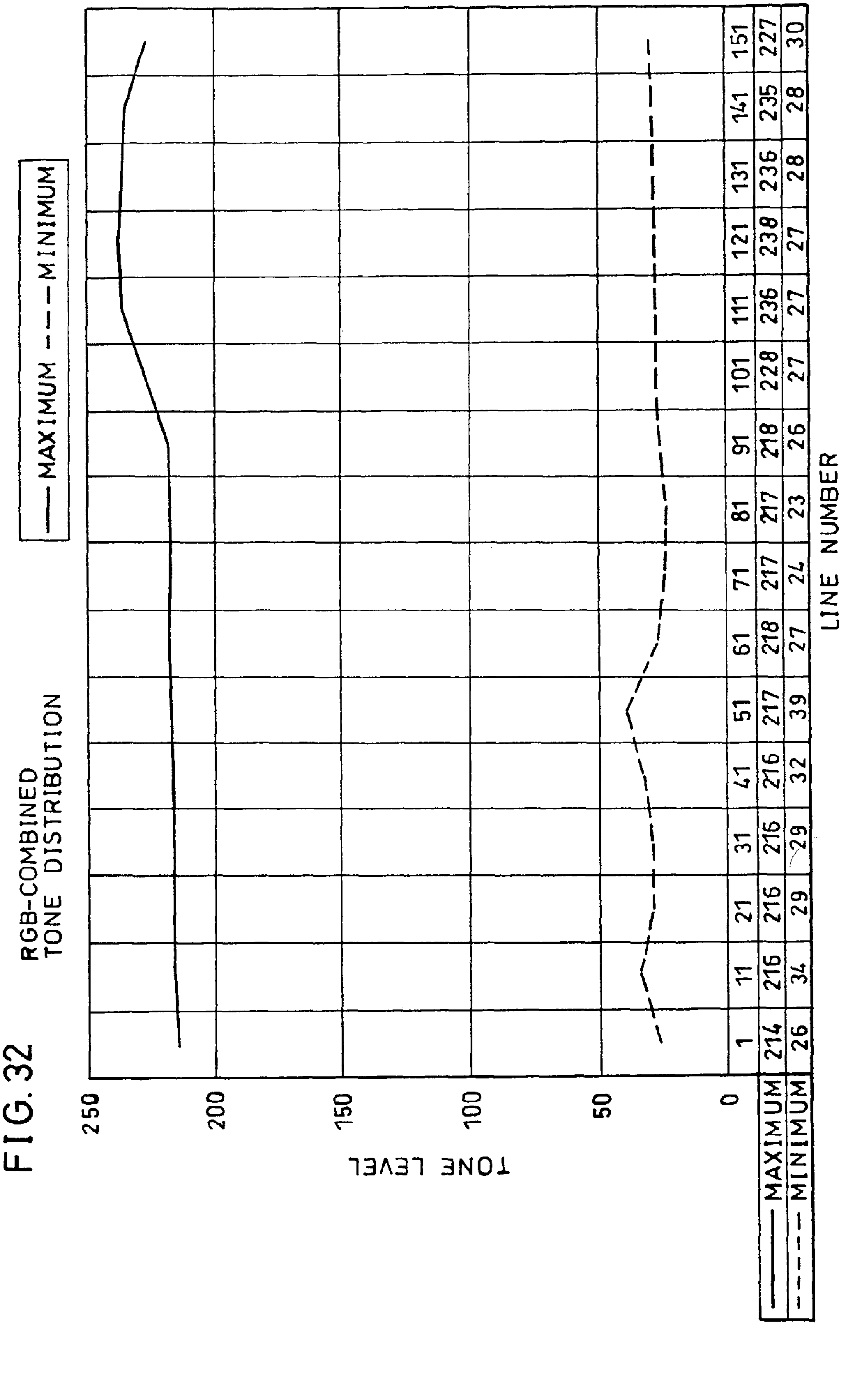
FIG. 32 is a graph showing maximum and minimum values of tone levels for pixels in a standard image for various scanning electrodes in a backlight unit for use in embodiment 4 in accordance with the present invention.

Now, referring to FIG. 31 and FIG. 32, the following description will discuss, as an example, how the flashing periods of the fluorescent lamps 10 are determined.

FIG. 31 is a block diagram of a control circuit 22 for controlling the flashing of the backlight unit 21 in FIG. 15. In the control circuit 22, a comparator 23 detects the maximum value of an incoming image information signal (maximum value of tone levels of pixels) in every horizontal scanning period and records the result in a line memory 25. The line memory 25 then provides data on the maximum value over a period corresponding to one of the fluorescent lamps 10 to the processor 26. The processor 26 calculates data on the maximum value for the line corresponding to that one of the fluorescent lamps 10 from the data on the maximum value for every line, determines the flashing periods of the fluorescent lamps 10 in direct proportion to the maximum value of tone levels of pixels corresponding to the elongated light source divided by the maximum tone level displayed by the present display device, and provides backlight-control, synchronization signal outputs OHP1 to OHP8 to open the switch 17 corresponding to the fluorescent lamp 10 and the switch 8 for use to provide power source from the inverter 9 corresponding to the fluorescent lamp 10.

The memory 24 delays the incoming image information signals respectively by periods required to detect the maximum values of tone levels of pixels corresponding to the fluorescent lamps 10, and produces a delayed image information signals for output. The delayed image information signal is synchronized with the backlight control signals OHP1 to OHP8.

The incoming image information signals delayed by the memory 24 is processed by the processor 27 according to the maximum tone level displayed by the present display device divided by the maximum value of tone levels of pixels corresponding to the elongated light source, and supplied to the TFT liquid crystal panel as delayed image information signals.

FIG. 32 is a graph showing outputs of the comparator 23 in the control circuit 22 shown in FIG. 31 as a result of the input of a standard image. In this graph, the R, G and B colors are displayed at 256 tone levels from 0 to 255, and maximum values of tone levels of pixels are detected without distinguishing between the R, G, and B colors. The data on the maximum values are stored in the line memory 25 shown in FIG. 31, and the maximum values of tone levels of pixels for the individual fluorescent lamps 10 are detected using the processor 26. For example, the pixels corresponding to the fluorescent lamp CCF1 have a maximum value of 216. The processor 26 sets the flashing period of the fluorescent lamp CCF1 to 0.847 times the maximum flashing period of all the fluorescent lamps, where the ratio, 0.847, is obtained from 216/255, that is, the maximum value of tone levels of pixels for the fluorescent lamp CCF1 divided by the maximum display tone level.

The processor 27 supplies these image information signals corresponding to the fluorescent lamp CCF1 to the TFT liquid crystal panel, after amplifying them 1.18 fold, where the ratio, 1.18 is obtained from 255/216, that is, the maximum display tone level divided by the maximum value of tone levels of pixels for the fluorescent lamp CCF1.

As detailed so far, a first display device in accordance with the present invention is arranged so as to include:

a display panel with pixels which are arranged in two dimensions, each of the pixels being constituted by an element capable of effecting a display through control of transmittance and reflection of light;

scanning means for carrying out first scanning on the pixels sequentially in a first direction of the display panel so as to set the pixels to respective display states according to information to be displayed by the pixels; and illumination means for illuminating the individual pixels with intensity of light which increases and subsequently decreases in synchronism with the first scanning carried out by the scanning means, but only after the first scanning.

By determining in this manner from which display state to which display state each element, constituting one of the pixels, change and also in which changing state and during which period the element is illuminated, a uniform tone representation always results according to a desired display state without having to wait for the transmittance or reflection state of the element to light to completely change.

Therefore, illuminating periods can be determined independently from the change speeds (response speeds) regarding state change of the elements constituting the pixels.

During periods that are not designated as illuminating periods, the pixels in the display device do not need to be completely dark, but only have to emit light with a reduced intensity than during illuminating periods to improve moving-image quality.

A second display device in accordance with the present invention is arranged so as to include:

a display panel with pixels which are arranged in two dimensions, each of the pixels being constituted by an element capable of effecting a display through control of transmittance and reflection of light;

scanning means for carrying out first scanning on the pixels sequentially in a first direction of the display panel so as to set the pixels to respective display states according to information to be displayed by the pixels; and illumination means for illuminating the individual pixels with intensity of light which increases and subsequently decreases in synchronism with the first scanning carried out by the scanning means, but only after the first scanning, wherein:

the scanning means carries out second scanning on the pixels sequentially in the first direction so as to initialize some of the pixels which have changed the display states thereof in the first scanning; and the illumination means controls the illumination so as to reduce the intensity of light in the first scanning in synchronism with the second scanning carried out by the scanning means.

In a case of carrying out reset scanning following display scanning, by lowering intensity of light in each display area of the display device independently from the others approximately at the reset scanning, the reset scanning can be carried out without reduction in contrast.

Further, the illuminating means may control the illumination so as to vary the intensity of light or illuminating period in synchronism with the first scanning according to the information to be displayed by the pixels.

By varying the intensity of light illuminating each display area of the display device according to the information on the display area in this manner, the display area is set to a maximum luminance which is most suited to the data according to which an image is displayed in the display area.

Further, by varying the maximum luminance for each display area, contrast can be improved, for example, by effecting a white display in a display area and a black display in another display area.

A first light source in accordance with the present invention which is applicable in either one of the first and second display devices above is such that the light source is arranged according to either one of the first and second inventions so as to include:

n elongated light sources (n is a positive integer) disposed in a second direction which is perpendicular to the first direction; and switches, which are connected in series with the elongated light sources, for controlling turning on/off of the elongated light sources;

wherein, m flash circuits (m is a positive integer smaller than n) cause the n elongated light sources to flash through the control of the switches.

The light source may be such that it includes another switch, which is interposed between the flash circuits and a power supply device for use with the flash circuits, for controlling connecting/disconnecting of power supply from the power supply device.

Alternatively, the light source may be arranged so that the number, m, of the flash circuits is determined so as to satisfy $m \geqq n/l$ where l is a positive real number representing a ratio of a field period to a maximum flashing period of the elongated light sources.

In this case, the number of flash circuits can be reduced by the value, n−m, which allows the light source to have a simplified overall arrangement and be reduced in dimensions.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A display device, comprising:

a display panel with pixels which are arranged in two dimensions, each of the pixels being constituted by an element capable of effecting a display through control of transmittance or reflection of light;

scanning means for carrying out first scanning on the pixels sequentially in a first direction of the display panel so as to set the pixels to respective display states according to information to be displayed by the pixels; and illumination means for illuminating the individual pixels while scanning in a direction same as a direction of the first scanning, with intensity of light which increases and subsequently decreases but does not become completely dark to emit light with an intensity lower than during illuminating period even after decrease of intensity, wherein the scanning means carries out a second scanning on the pixels sequentially in the first direction so as to initialize some of the pixels which have changed the display states thereof in the first scanning; and the illumination means controls the illumination so as to reduce the intensity of light in the first scanning to a relatively small value in synchronism with the second scanning carried out by the scanning means.

2. The display device as defined in claim 1, wherein the illumination means controls the illumination so that intensity of light illuminating pixels in synchronism with the first scanning exceeds intensity of light illuminating other pixels within a response time in which the pixels completely change the display states thereof.

3. A display device, comprising:

a display panel with pixels which are arranged in two dimensions, each of the pixels being constituted by an element capable of effecting a display through control of transmittance or reflection of light;

scanning means for carrying out first scanning on the pixels sequentially in a first direction of the display panel so as to set the pixels to respective display states according to information to be displayed by the pixels; and illumination means for illuminating the individual pixels while scanning in a direction same as a direction of the first scanning, with intensity of light which increases and subsequently decreases but does not become completely dark to emit light with an intensity lower than during illuminating period even after decrease of intensity, wherein the illumination means controls the illumination so that intensity of light illuminating pixels in synchronism with the first scanning exceeds intensity of light illuminating other pixels within a response time in which the pixels completely change the display states thereof.

4. A display device, comprising:

a display panel with pixels which are arranged in two dimensions, each of the pixels being constituted by an element capable of effecting a display through control of transmittance or reflection of light;

scanning means for carrying out first scanning on the pixels sequentially in a first direction of the display panel so as to set the pixels to respective display states according to information to be displayed by the pixels; and illumination means for illuminating the individual pixels while scanning in a direction same as a direction of the first scanning, with intensity of light which increases and subsequently decreases but does not become completely dark to emit light with an intensity lower than during illuminating period even after decrease of intensity, wherein a time period from end of the first scanning on the pixels to beginning of illumination by the illumination means is constant and shorter than a pixel response period which is a period necessary for the pixels to be set to the display states by the first scanning.

5. A display device, comprising:

a display panel with pixels which are arranged in two dimensions, each of the pixels being constituted by an element capable of effecting a display through control of transmittance or reflection of light;

scanning means for carrying out first scanning on the pixels sequentially in a first direction of the display panel so as to set the pixels to respective display states according to information to be displayed by the pixels; and illumination means for illuminating the individual pixels while scanning in a direction same as a direction of the first scanning, with intensity of light which increases during an illuminating period and subsequently decreases but does not become completely dark to emit light with an intensity lower than during the illuminating period even after decrease of intensity, wherein a reset scanning which makes pixels into dark display state is carried out sequentially before the first scanning within one frame period, and power to the illuminating means which accords to pixels where the reset scanning is carried is turned off roughly at the same time as the reset scanning.

6. The display device according to claim 5, wherein the reset scanning is carried out within a period from a turn-off timing of illuminating of the illuminating means to a change timing of luminance of the illuminating means to lowest brightness.

7. The display device according to claim 5, wherein a period from a turn-off timing of illuminating of the illuminating means to a change timing of luminance of the illuminating means to lowest brightness is not less than one frame period minus a period during which the illuminating means makes illumination.

8. The display device according to claim 5, wherein the illumination means includes a light source, the light source including an output terminal having a switch, wherein turning off is done by making the switch off.

9. A display device, comprising:

a display panel with pixels which are arranged in two dimensions, each of the pixels being constituted by an element capable of effecting a display through control of transmittance or reflection of light;

scanning means for carrying out first scanning on the pixels sequentially in a first direction of the display panel so as to set the pixels to respective display states according to information to be displayed by the pixels; and illumination means for illuminating the individual pixels while scanning in a direction same as a direction of the first scanning, with intensity of light which increases during an illuminating period and subsequently decreases but does not become completely dark to emit light with an intensity lower than during the illuminating period even after decrease of intensity, the illumination means includes:

n elongated light sources (n is a positive integer) disposed in a second direction which is perpendicular to the first direction;

switches, which are connected in series with the elongated light sources, for controlling turning on/off of power to the elongated light sources;

m flash circuits (m is a positive integer smaller than n) for causing the elongated light sources to flash; and flash control means for controlling the switches so that the m flash circuits can cause the n elongated light sources to flash, wherein:

provided that p is an arbitrary positive integer, the elongated light sources are numbered CCF1, CCF2, CCF3, . . . from an end, and the flash circuits are numbered INV1, INV2, INV3, . . . , INVm, the elongated light sources are flashed by the same flash circuit every predetermined number of the elongated light sources in a such manner that:

CCF1, CCF (1+m), CCF(1+2 m), . . . , CCF (1+pm) are flashed by one of the flash circuits, CCF2, CCF (2+m), CCF(2+2 m), . . . , CCF (2+pm) are flashed by another of the flash circuits, and CCF3, CCF (3+m), CCF(3+2 m), . . . , CCF (3+pm) are flashed by further another of the flash circuits.

10. The display device according to claim 9, wherein each of the flash circuits turns on only one of the elongated light sources simultaneously.

11. The display device according to claim 9, wherein length of the first scanning is equal to length of one frame period.

12. The display device according to claim 9, wherein a reset scanning which makes pixels into dark display state is carried out sequentially after the first scanning within one frame period.

13. A display device, comprising:

a display panel with pixels which are arranged in two dimensions, each of the pixels being constituted by an element capable of effecting a display through control of transmittance or reflection of light;

scanning means for carrying out first scanning on the pixels sequentially in a first direction of the display panel so as to set the pixels to respective display states according to information to be displayed by the pixels; and illumination means for illuminating the individual pixels while scanning in a direction same as a direction of the first scanning, for a limited period of time, so that light sources as the illuminating means are flashed on and off sequentially according to physical positions within the display, wherein the pixels are divided into plural pixel groups, each pixel group comprising plural pixels, the illuminating means has plural light sources, each light source arranged to illuminate a respective one of the pixel groups, and length of a flashing period of each light source within a frame period is set according to a maximum amplitude of video signals from which an image is displayed by the pixels of the corresponding pixel group within the frame period.

14. The display device according to claim 13, wherein a maximum luminance of every light source is variable according to physical positions within the display.

15. The display device according to claim 13, wherein the flashing period of every light source as the illumination means is in direct proportion to a maximum luminance of the video signal of a portion to be illuminated by the light source.

16. The display device of claim 13, wherein the first direction of the display panel is a single, linear direction.

17. A display device, comprising:

a display panel with pixels which are arranged in two dimensions, each of the pixels being constituted by an element capable of effecting a display through control of transmittance or reflection of light;

scanning means for carrying out first scanning on the pixels sequentially in a first direction of the display panel so as to set the pixels to respective display states according to information to be displayed by the pixels; and illumination means for illuminating the individual pixels while scanning in a direction same as a direction of the first scanning, for a limited period of time, so that light sources as the illuminating means are flashed on and off sequentially according to physical positions within the display, wherein length of a flashing period of each light source as the illuminating means is varied according to video signals from which an image is displayed by the pixels; and wherein length of the flashing period is varied from 0 to half of a field period according to an amplitude of the video signals.

18. A display device, comprising:

a display panel with pixels which are arranged in two dimensions, each of the pixels being constituted by an element capable of effecting a display through control of transmittance or reflection of light;

scanning means for carrying out first scanning on the pixels sequentially in a first direction of the display panel so as to set the pixels to respective display states according to information to be displayed by the pixels; and illumination means for illuminating the individual pixels while scanning in a direction same as a direction of the first scanning, for a limited period of time, so that light sources as the illuminating means are flashed on and off sequentially according to physical positions of the display, wherein length of a flashing period of each light source as the illuminating means is varied according to video signals from which an image is displayed by the pixels in direct proportion to a maximum luminance of the video signal of a portion to be illuminated by the light source, and in inverse proportion to a maximum luminance of the display device.

* * * * *